(12) United States Patent
Ruggeri

(10) Patent No.: US 10,591,269 B2
(45) Date of Patent: Mar. 17, 2020

(54) MEASURING ASSEMBLY INCLUDING A RECOGNITION SYSTEM, AND RECOGNITION METHOD

(71) Applicant: Marposs Societa' Per Azioni, Bentivoglio (IT)

(72) Inventor: Alessandro Ruggeri, Bologna (IT)

(73) Assignee: Marposs Societa' Per Azioni, Bentivoglio (BO) (IT)

( * ) Notice: Subject to any disclaimer, the term of this patent is extended or adjusted under 35 U.S.C. 154(b) by 153 days.

(21) Appl. No.: 15/571,196

(22) PCT Filed: May 3, 2016

(86) PCT No.: PCT/EP2016/059948
§ 371 (c)(1),
(2) Date: Nov. 1, 2017

(87) PCT Pub. No.: WO2016/177758
PCT Pub. Date: Nov. 10, 2016

(65) Prior Publication Data
US 2018/0283839 A1    Oct. 4, 2018

(30) Foreign Application Priority Data

May 4, 2015  (IT) .............................. BO2015A0226
May 4, 2015  (IT) .............................. BO2015A0227
(Continued)

(51) Int. Cl.
*G01B 5/00*    (2006.01)
*G01B 3/26*    (2006.01)
(Continued)

(52) U.S. Cl.
CPC ............. *G01B 5/0002* (2013.01); *G01B 3/24* (2013.01); *G01B 3/26* (2013.01); *G01B 5/12* (2013.01);
(Continued)

(58) Field of Classification Search
CPC .......... H02J 7/0047; H02J 7/025; G01B 5/002
(Continued)

(56) References Cited

U.S. PATENT DOCUMENTS 3,454,869 A    7/1969  Strauss et al.
3,641,336 A    2/1972  Boin
(Continued)

FOREIGN PATENT DOCUMENTS

GB    2 120 780 A    12/1983
JP    2006-258660 A    9/2006
(Continued)

*Primary Examiner* — Christopher W Fulton
(74) *Attorney, Agent, or Firm* — Blank Rome LLP

(57) ABSTRACT

Measuring assembly with a measuring apparatus and a recognition system, and recognition method to detect the correct positioning of a removable device such as a comparator to check the shape and/or dimensions of a mechanical part with respect to a stationary part that includes at least one mechanical reference for the removable device. The system comprises a field source disposed in the stationary part that generates a field and a matching element disposed on the removable device that is able to alter the propagation of this field if correctly positioned relative to the field source. A sensor fixed to the stationary part in an appropriate position detects or not the field and generates a resulting detection signal detection or non-detection signal. A processing unit receives the signal generated by the sensor and on the basis of this provides information about the correct or
(Continued)

incorrect positioning of the removable device with respect to the stationary part. The recognition system can be of the magnetic or optical type.

17 Claims, 18 Drawing Sheets

(30) Foreign Application Priority Data

| May 4, 2015 | (IT) | ................................ BO2015A0228 |
| May 4, 2015 | (IT) | ................................ BO2015A0229 |
| May 4, 2015 | (IT) | ................................ BO2015A0230 |

(51) Int. Cl.

| G01B 3/24 | (2006.01) |
| G01B 5/12 | (2006.01) |
| G01B 21/04 | (2006.01) |
| H02J 50/10 | (2016.01) |
| H02J 50/90 | (2016.01) |
| H02J 7/00 | (2006.01) |
| H02J 7/02 | (2016.01) |

(52) U.S. Cl.
CPC .......... *G01B 21/047* (2013.01); *H02J 7/0047* (2013.01); *H02J 50/10* (2016.02); *H02J 50/90* (2016.02); *G01B 2210/58* (2013.01); *H02J 7/025* (2013.01)

(58) Field of Classification Search
USPC .............. 340/636.1, 568.1; 33/700, 701, 501
See application file for complete search history.

(56) References Cited

U.S. PATENT DOCUMENTS

| 4,031,449 | A  |    | 6/1977  | Trombly |             |
|-----------|----|----|---------|---------|-------------|
| 7,209,038 | B1 | *  | 4/2007  | Deconinck | ......... G08B 13/1409 |
|           |    |    |         |           | 340/541 |
| 2009/0015418 | A1 | * | 1/2009 | Koike | ................... G06F 21/554 |
|           |    |    |         |         | 340/636.1 |
| 2010/0207771 | A1 | * | 8/2010 | Trigiani | .............. B60L 11/1816 |
|           |    |    |         |          | 340/636.1 |
| 2011/0221387 | A1 | * | 9/2011 | Steigerwald | .......... B60L 11/182 |
|           |    |    |         |             | 320/108 |
| 2014/0182147 | A1 |   | 7/2014 | Munroe et al. | |
| 2014/0240138 | A1 | * | 8/2014 | Lee | ..................... H04M 1/7253 |
|           |    |    |         |      | 340/636.1 |
| 2015/0054456 | A1 | * | 2/2015 | Yamakawa | ............. H02J 50/80 |
|           |    |    |         |          | 320/108 |
| 2016/0134151 | A1 | * | 5/2016 | Fischer | ................ H02J 7/0044 |
|           |    |    |         |         | 320/108 |
| 2016/0261145 | A1 | * | 9/2016 | Kinoshita | ............... H02J 17/00 |
| 2017/0331318 | A1 | * | 11/2017 | Jankins | ................. H02J 50/12 |
| 2017/0346349 | A1 | * | 11/2017 | Shimokawa | ........... H02J 50/90 |
| 2018/0109131 | A1 | * | 4/2018 | Nemoto | .................. H02J 50/12 |
| 2018/0233956 | A1 | * | 8/2018 | Moussaoui | .............. H02J 50/12 |

FOREIGN PATENT DOCUMENTS

| WO |    | WO 95/01547   | A1 |   | 1/1995  |         |           |
|----|----|---------------|----|---|---------|---------|-----------|
| WO |    | WO 2007/128805 | A2 |   | 11/2007 |         |           |
| WO |    | WO 2010/108990 | A1 |   | 9/2010  |         |           |
| WO |    | WO 2014/023697 | A1 |   | 2/2014  |         |           |
| WO |    | WO-2015162154 | A1 | * | 10/2015 | .......... | B24B 49/003 |

* cited by examiner

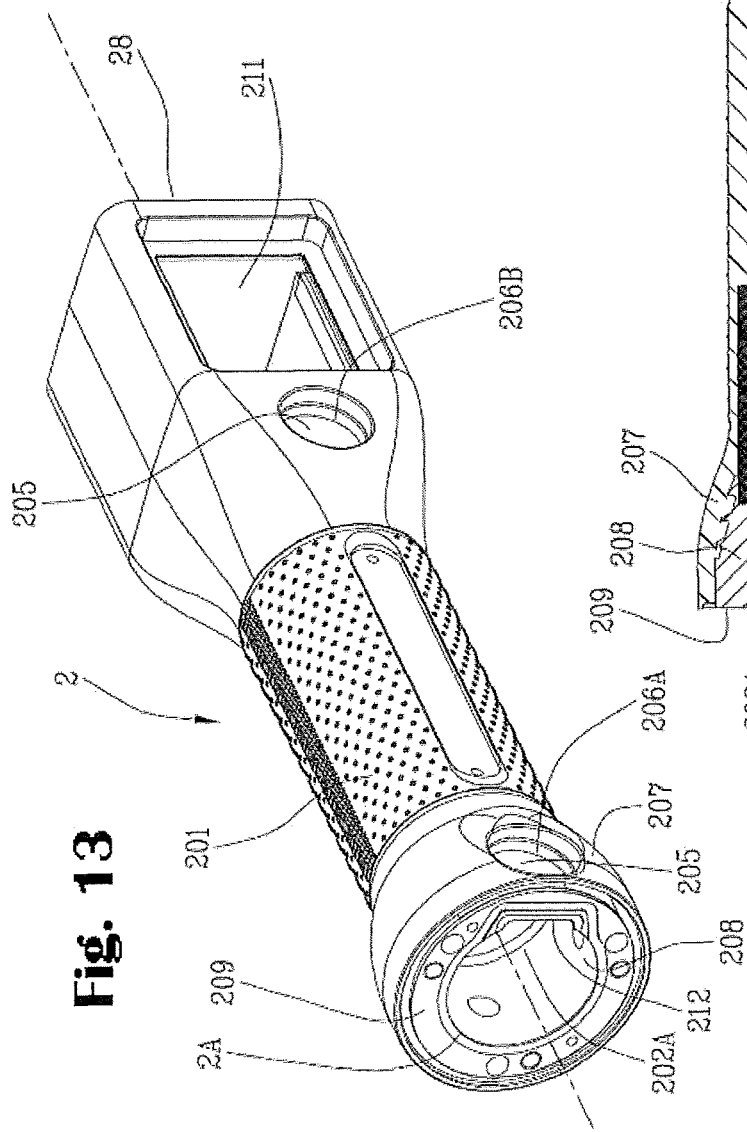
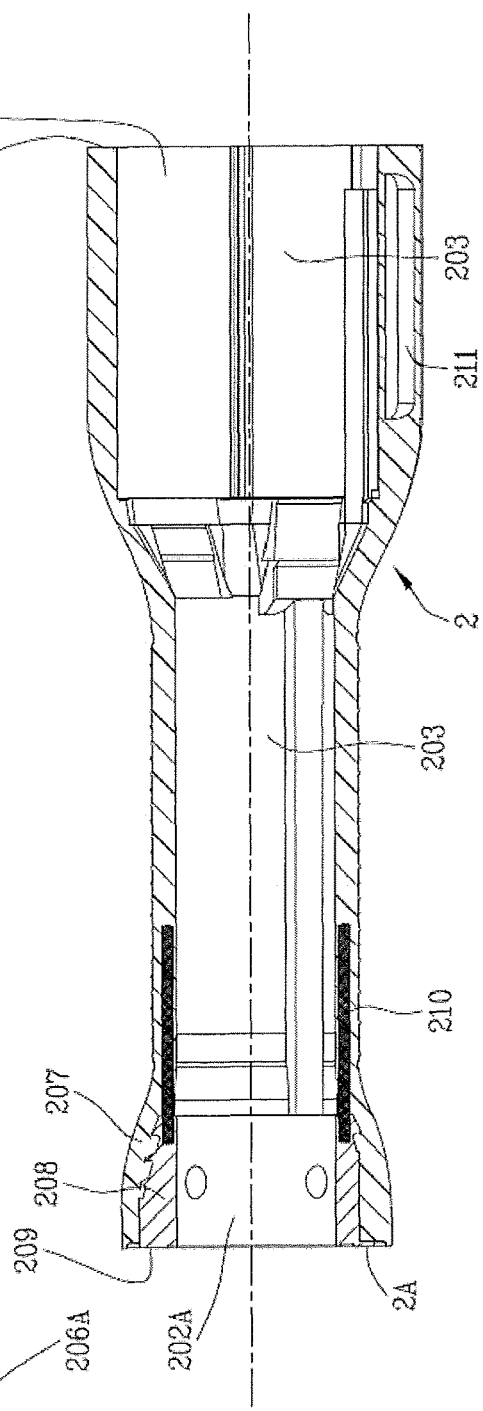

MEASURING ASSEMBLY INCLUDING A RECOGNITION SYSTEM, AND RECOGNITION METHOD

TECHNICAL FIELD

The technical field of the present invention is that of measuring assemblies that make use of electronic measuring apparatuses including manual gauges or comparators, that is gauges that are manually operated by a user.

The present invention relates to a measuring assembly including a measuring apparatus and a recognition system for the measuring apparatus, and a relative method that allows to detect the correct positioning of a removable device with respect to a stationary part.

An assembly and a method according to the invention can include in particular an apparatus for checking the shape and/or dimensions of a mechanical piece, for example a comparator, comprising a charging device which is automatically activated as a consequence of the recognition of the correct positioning of the comparator by the recognition system.

BACKGROUND ART

Assemblies are known including systems to detect the presence and in particular the correct positioning of an object relative to its support in various technical fields.

In the field of measuring assemblies with measuring or checking apparatuses, more particularly, of manual comparators for dimensional and/or shape checking of mechanical pieces, it is important that the comparators are correctly positioned with respect to the relative support for example at the time when, after having performed the checking operations, the comparator is put away, or stored, by the operator or user. It is known to employ a recognition system that detects, for example by means of a mechanical switch, and indicates, for example through an indicator light or a proper message managed by electronics, the correct positioning of the comparator. This allows to reduce the idle time. Moreover, in this way the operator can have an immediate visual indication of the correct positioning, so helping to avoid accidental falls of the device due to improper placement. Similarly, in a storage structure containing a large number of comparators, the presence of a recognition system allows the operator to easily and quickly get information of the possible incorrect positioning of one or more comparators, so preventing the emission of signals of alarm and consequent loss of time spent to search the cause of the malfunction.

Recognition systems of this type are also applied to wireless comparators in combination with battery charging devices. These comparators, comprising a handle for manual use, are powered by batteries, typically housed in the handle, which, through an electric circuit comprising a number of electrical contacts, provide current to the transmission system of the comparator, the latter being normally housed in the handle, too. The wireless comparators offer far better handling features and ease of use compared to the wired comparators, but have the disadvantage that the batteries need to be replaced and/or recharged whenever they discharge. There are known different devices for charging batteries, which provide either the recharging of the batteries mounted in the comparator, or the removal of the batteries and their separate charging on suitable charging devices. Obviously, the charging of the batteries when they are embedded in the comparator is more convenient and advantageous and can be carried out by providing the comparator with appropriate electrical contacts, for example holes or sockets for pins, or contact pads, intended to be coupled to corresponding electrical contacts of an external power supply. Inductive type charging devices are also known which do not feature uncovered and exposed contacts so as to ensure operating reliability and safety for the operator. Known comparators including inductive charging systems can be placed on a proper charging base, or stand, and there they can be left for the time necessary to recharge. The correct positioning of the comparator on the stand is generally defined by bearing surfaces. Possible accidental movement between the parts, or an imprecise arrangement on the stand may prevent the proper charging. In addition, during charging, in the shop floor environment where the comparator is normally used, the comparator placed on the charging stand may undergo shocks and/or external stresses, so that the comparator may fall and break away from the charging station, causing damages and interrupting the charging process.

To ensure that the charging of the batteries takes place only when the comparator is properly arranged in relation to the charging device, recognition systems are provided. The recognition system automatically triggers the charging when the comparator is properly positioned and interrupts the charging whenever the comparator is removed from the stand or takes an incorrect position for example because of an accidental collision. These recognition systems provide, for example, to have, in addition to the transmission of power to charge the battery, a data communication to check the presence and the status of the comparator. In case of a negative response from the comparator, the power supply is not activated or is stopped. Such systems are also applicable in the industrial sector including rechargeable manual tools, such as drills, screwdrivers or other tools, and even in different sectors of activity for instance for charging the batteries of mobile phones.

This type of recognition systems requires two complex logic units, one in the charging stand and one in the removable device, that make the structure more expensive and complex and may face size problems inside the structure itself.

Other types of recognition systems are known.

The U.S. Pat. No. 4,031,449 for example, describes a battery charger with inductive coupling and comprising a proximity sensor to activate the power system when the battery to be charged is present and properly arranged. When the battery is present and properly arranged, the magnetic field generated by a primary winding arranged in the charger propagates in the secondary winding connected to the battery to be recharged and is not detected by the proximity sensor. On the contrary, when the battery is not properly coupled with the battery charger, the magnetic field passes through the proximity sensor. It is, however, necessary to maintain a minimum level of current to allow the recognition system to detect the presence of the battery when the latter is approached to the charger. The operation of the recognition system thus requires that the charging device continuously provide power to the system.

A different example of recognition system is described in U.S. Pat. No. 3,641,336 relating to an emergency electric lamp provided with a device for charging the battery. FIG. 3 of this patent shows a solution comprising a security system to interrupt the power supply when the lamp is separated from the charging device. This safety device comprises a switch of the "reed switch" type and a magnet fixed respectively to the charging device and to the lamp. When the charging device and the lamp are coupled to each other, thanks to the presence of the magnet the switch is closed and let the current pass. When instead the charging device is removed, the switch opens and prevents the passage of the current.

In general, an electromechanical element, such as the switch, in the recognition system can undergo wear problems and thus cause malfunction of the system, and makes the seal of the rechargeable device more complex and expensive.

As regards the measuring and/or checking apparatuses that are part of the assembly according to the invention, examples of manual measuring and checking apparatuses such as comparators are described in patent documents filed by the same Applicant of the present application and published with n. WO9501547A1, WO2007128805A2 and WO2010108990A1.

These comparators comprise a shell defining a handle that can be gripped by the user to handle the device.

The shell is hollow and houses electronic circuits or a board, and in some cases a position transducer and a battery to power the device.

Furthermore, each comparator has a probe with at least one movable feeler adapted to touch the workpiece to be checked. To measure a projecting element, in particular a part featuring an outer diameter, the feeler can be supported by a fork shaped element and the comparator is referred to as "fork gauge" or even "snap gauge". If the element to be measured is a cylindrical hole or seat, the feeler is usually mounted on a cylindrical ogive or drum, and the comparator is referred to as "plug gauge".

In a typical embodiment, the probe has a movable stem coupled to the feeler and the position transducer. Furthermore, the comparator may comprise a user interface to display information on the operation of the device. In the above-mentioned examples, the interface includes an LED that lights up to indicate that the device is on.

The comparator is also provided with a pushbutton accessible from the outside of the shell to transmit control signals to the electronic circuits including a control to acquire the measurement data detected by the transducer.

These industrial measurement systems are used widely, even though not exclusively, in the automotive industry.

From the practical point of view, the user must carry out—in his workstation—a series of measurements, one after the other, on a same complex mechanical system. For example, on a cylinder head of an engine, there are several openings and protruding parts to be measured, and only after having completed all measurements, the user gets away the cylinder head from the workstation, to receive a new cylinder head to be measures and checked.

In this context, it is noted that, normally, a workstation is equipped with a plurality of measuring and checking apparatuses, which form a work kit, that is a measuring and checking kit for the user. Typically, the various comparators differ from one another because they include different probes as far as type, size or shape are concerned.

Operatively, the user, after having gripped the comparator, positions it with the probe coupled to the mechanical part to be measured and, when he considers that the positioning of the comparator is correct, pushes the pushbutton to acquire the measurement data.

The measurement data should be further elaborated. To this end, the workstation is generally equipped with a computer provided with a display.

In some solutions, the comparator is connected to the computer via an electrical cable. In other solutions, the comparator exchanges data wirelessly with the computer, so granting greater freedom of movement to the user who handles the comparator.

The above-mentioned technological sector implies various requirements.

A requirement is to make sure that the measurement and/or checking operations are efficient and highly productive.

This means reducing the likelihood that the user makes mistakes and allowing him to work quickly, reducing to a minimum the execution time of operations that the user must carry out.

To this end, the computer of the workstation, generally, implements a guided procedure or wizard that appears on the screen of the workstation, so the user can see and follow a guided sequence of operations to be performed. For example, the wizard will suggest to the user to take a certain comparator or group of comparators for measuring a part of a particular workpiece, then it will suggest to store that comparator and to take another one for carrying out a new measurement, and so on.

This helps to reduce the number of situations in which the user performs wrong operations and increases the efficiency of work.

However, the adoption of the wizard has some limitations.

One limitation is due to the risk that the user is wrong to select the comparator suggested by the wizard.

An error of this type involves at least that some time gets lost.

Moreover, idle times remain due to a delay between the instant at which the user grasps the proper comparator and the instant in which the comparator is ready to perform the measurement.

In order to make the workstation, or the single comparator, most versatile and contain costs, typically the probe of the comparator is interchangeable with other probes.

In this regard, another need is to make particularly rapid and safe the replacement of the probe in the comparator. In this context, the known solutions, described in the above-mentioned patent documents, do not allow to properly combine the needs of connection speed, firmness of the connection and ease of adjustment of the relative angular position between the probe and the shell.

Another requirement is to make the user's work particularly easy and convenient, as regards both the reading of the data detected by the comparator upon acquisition and the handling of the comparator itself. In this context, in the solutions in use, the user reads the data detected by the comparator (for example a diameter of a seat or opening) on the screen of the workstation and, when he considers that the displayed value is stable or correct, controls the acquisition of such data by actuating the pushbutton. This is inconvenient and may cause mistakes, because the user, in order to check the data on the screen, has to turn his head and look away from the comparator that has to be firmly kept in the correct position, coupled to the mechanical piece to be measured.

It is also to be noted that the user is required to hold the comparator in various spatial orientations, depending on the position and the shape of what is to be measured. This implies that the comparator of the known examples is not ergonomic and easy to use in all situations, with particular reference to the need to maintain the comparator in the correct position and at the same time press the pushbutton.

In this light and in connection with manual gauges or comparators as the ones according to the present invention, particular importance is assumed by the ergonomics of the product. In fact, in the precision measurements it is important to arrange and firmly keep the comparator in the proper position when the measurement is acquired. In practice, the ease with which the comparator is grasped, the accessibility to the pushbutton for the acquisition of the measurement data, the convenience with which the comparator can be kept in position, the ease with which the measurement can be read are particularly relevant aspects.

Another requirement refers to the robustness and reliability of the gauge or comparator.

Such gauges are intended to be used in an industrial environment where shocks may occur and where it is common to find contaminants, in the form either of powders and of liquid. Furthermore, when the user inserts the probe in a seat and presses with his hand on the comparator to acquire the measurement, he exerts on the connection zone between the probe and the shell a force, more specifically a bending moment, which tends to break the gauge itself. For these reasons, this type of comparators is subject to particular risks of damage by mechanical stresses or of failure for the entry of contaminants.

Further to the need to protect from external agents such as liquids and powders, there is also the compelling necessity, given the different regulations in force in many countries, to ensure a high level of electromagnetic compatibility of the product. That is, it is required to ensure that, in the presence of phenomena such as electrostatic discharge (ESD) and the like, the operation of the product is not compromised, permanently or even temporary.

These needs related to the robustness and reliability, as well as electromagnetic compatibility, cannot find a fully satisfactory response in the currently available gauges.

Indeed, certain solutions of the known comparators, for example in order to allow to adjust the mutual angular position between the probe and the shell, in fact lessen the robustness of the probe.

A further need for the known comparators is to simplify the maintenance and reparability, for reasons of time and cost.

In this regard, it is noted that the comparators or gauges of the known solutions are generally not easy to assemble, for example because they imply rather complex internal electrical connections to be carried out inside the shell, which are difficult to achieve.

DISCLOSURE OF THE INVENTION

An object of the present invention is to provide a recognition system for a measuring apparatus for recognizing the correct positioning of a removable device with respect to a stationary part which overcomes the above-mentioned drawbacks and presents a more simple and economic structure.

A further object of the present invention is to provide a method for recognizing the correct positioning of a removable device for checking dimensions and/or shape of a mechanical piece with respect to a stationary part which is of simple and economic implementation.

The recognition system according to the invention is a stand-alone system that can be used regardless of the presence of a battery charging device. It can be used, for example, simply to determine if a removable device is properly positioned with respect to a stationary part.

To this end there may be lights, such as LEDs, that give information about the recognition or non-recognition of the removable device, and a beep can be added. Alternatively, the recognition system can send a logic signal to a machine logic.

Associating the recognition system according to the invention to a charging system for the battery of a removable device it is possible to automatically activate the charging of the battery on the basis of the detection of the correct positioning of the removable device with respect to the stationary part. Furthermore, any movement of the removable device during the charging phase, for example due to accidental impacts, is detected by the recognition system and the charging is discontinued.

The recognition system according to the invention is preferably of the magnetic type, but can also be of another type, for example optical. A preferred embodiment of the recognition system according to the invention provides the use of permanent magnets which do not need any power supply.

The system can be integrated in the structure of the removable device and of the stationary part in a simple and economic way without the need to introduce heavy structural changes. Also the overall size of the system is extremely limited.

Moreover, the absence of electromechanical elements, such as switches with moving parts that are subject to breakage and wear, allows to increase the reliability and life expectancy of the recognition system as well as to easily provide a sealed system.

Other advantageous aspects in connection with measuring apparatuses—and methods—that can be part of—and used in—a measuring assembly according to the present invention are now mentioned.

A plurality of measuring apparatuses (or removable devices, or comparators) of the measuring assembly can be part of an equipped workstation allowing a user to perform a plurality of checkings and measures of a complex mechanical structure having various parts to be measured.

The workstation comprises a processor, also called "main processor" in the present description.

Preferably, the workstation also includes a display screen (also called a display, or a "main screen" in the present description), connected to the main processor.

The workstation also comprises a corresponding plurality of holders, configured to receive the respective comparators, that for instance may be supported or hooked, when they are not used.

Preferably, the workstation comprises a wireless connection, for transmitting data between the main processor and the electronic circuits of each comparator. Alternatively the comparators are attached to the computer using signal cables or electrical cables (which may also electrically power the comparators).

Each comparator is manually operable by a user. In particular, the comparator has a handgrip and at least one pushbutton (or other control element). In addition, each comparator is equipped with electronic circuits, or electronic board, to acquire the measured data.

Each comparator has a switched-on, or fully powered, or "ON" configuration, in which it is arranged to perform the measurements, i.e. the checking of mechanical pieces, and a switched-off, or stand-by, or "OFF" configuration, of minimum energy consumption. The comparator is configured to automatically switch between the stand-by and the fully powered configurations.

The electronic circuits of the comparator are programmed to run a power-on procedure, to switch the comparator from the OFF to the ON configuration. Furthermore, the electronic circuits of the comparator are programmed to perform a power-off procedure, to switch the comparator from the ON to the OFF configuration.

The main processor is programmed with a sequence of instructions relating to the use in succession of two or more of the comparators of said plurality.

This sequence of instructions defines a wizard for the user, containing information about the sequence of operations to be performed.

An execution by the main processor of said sequence of instructions determines the generation of a wizard, which takes place in a predetermined time interval (determined by the sequence of instructions). Therefore, during execution of said sequence of instructions, the main processor knows, at each instant, which action (for example checking a given workpiece with a certain comparator) the user is executing according to the wizard, it knows which is the subsequent action that the user must perform and knows when the user will be informed to end the current action and start the subsequent. The latter situation corresponds to a change of the removable device: the comparator or comparators that the user is using should be put in place and one or more other comparators should be selected, for example.

Various embodiments are provided to make available to the user the information about the sequence of operations to perform according to said sequence of instructions.

In an embodiment, the main processor is programmed to turn on and off indicator lights (forming part of the workstation). In another embodiment, the main processor is programmed to generate sound messages (audio). Preferably, in addition or alternatively to the above examples relating to the indicator lights and audio messages, the main processor is programmed to display on the main screen a sequence of instructions relating to the use in succession of two or more of the comparators of the workstation. This has the function of guiding the user in the measuring and checking operation of mechanical parts.

In an embodiment, the main processor is programmed to transmit to the electronic board of one or more comparators of said plurality a power-on or a power-off signal, to switch the comparator to the ON or OFF configuration, respectively, as a function of the sequence of instructions displayed on the main screen.

The fact that the main processor automatically controls the power-on or the power-off the comparator, according to the sequence of instructions as displayed, allows the user to save the bother and time required to switch on or switch off the specific comparators when prompted by the guided procedure. In such a way the production efficiency increases.

In particular, the processor is programmed to transmit to the electronic board of one of the comparators of said plurality a power-on signal, so that the comparator that must be used is switched on when it must be used, or shortly before, according to the sequence of instructions. In the case in which the workstation includes the display screen, the processor transmits the power-on signal substantially concurrently (that is, at the same time or shortly before, for example one second before, or shortly after, for example, one second later) with the display of an instruction to use that comparator. This reduces the risk that the user selects the wrong comparator, because it induces the user to take the comparator that is, or is going to be, powered on.

Preferably, the main processor is programmed to transmit according to an instruction that comprises the use of one of the comparators of said plurality, a power-off signal to the electronic circuits of at least one of the other comparators (or, in one embodiment, all the other comparators) which is in the ON configuration and/or a power-on inhibit signal to the electronic circuits of at least one of the other comparators (or, in one embodiment, all the other comparators) which is in the OFF configuration.

Depending on the operation that the user has to perform, it is expected that he uses a single comparator at a time (in this case it is preferable that all the other comparators, which are not the one used or to next to be used, are powered off or inhibited); but the user can also be required to use two or more comparators simultaneously (in this case it is preferable that all the comparators that are used or should be used are switched on and that all the other comparators, which need not be used, are powered off or inhibited).

Therefore, in general, the processor (the main processor) is programmed to power on (at a given moment during the execution of the wizard or possibly in advance) the at least one comparator which, based on the preset sequence of settings defining the wizard, must be used, and is programmed to power off (possibly inhibit) the at least one comparator which, based on the preset sequence of settings defining the wizard, must be put in place, or stored, as it must not be used.

The turning off of any comparators when they should not be used further reduces the risk that the user selects the wrong comparator, because it induces the user to avoid grasping a powered off comparator. Moreover, energy is so saved, i.e. it is not wasted to keep comparators powered on when they are not in use.

Inhibiting the switching on of the comparators that are already in the OFF configuration and must not be used further reduces the risk of errors and loss of time due to the possible wrong selection of any such comparators different from the one indicated in the wizard. Any possible mistaken attempt by the user to power it on would be unsuccessful.

Preferably, the processor is programmed to transmit to the electronic board of one of the comparators of said plurality a power-on signal in an instant of a predetermined time interval (for example few seconds or in any case a time equal to or greater than the time to power on the comparator) preceding an instant of display of an instruction that requires the use of that comparator, or preceding the moment in which the operator has to grasp the comparator and use it.

This allows to avoid idle times due to the user waiting the selected comparator be turned on and ready for use.

Preferably, each comparator has its own display that can be backlighted. The electronic circuits of the comparator are programmed to activate the display, e.g. turning the backlight on, at the receipt of a power on signal.

This decreases the likelihood that the user choose the wrong comparator and reduces the times needed by the user to select and grasp the comparator shown in the wizard.

In an embodiment, each support element comprises a recharging terminal and each comparator is provided with a charging element connected to the battery. The recharging terminal of the support element is configured to cooperate with the charging element on board of the comparator, for generating a charging current for the battery, when the comparator is coupled to the support element.

Preferably, the recharging terminal of the support element is configured to interact without contact with the charging element on board of the comparator, as previously described in connection with the "charging base" or "stand". This allows to increase the seal of the comparator and the degree of protection from dust and liquids.

When the comparator is coupled to the support element and the battery is charging, the charging condition is detected by the electronic board of the comparator.

Preferably, the electronic board of the comparator is programmed to be set in a listening mode of a power-on or power-off or inhibition signal coming from the main processor. This makes the system particularly simple and efficient.

As an alternative to the automatic power-on procedure described above, or in association with it, it is possible to adopt different automatic power-on systems of the comparator so as to reduce the waiting time for the user between the power-on command and the time in which the comparator is actually ready for use.

Preferably, in each comparator, the electronic board is connected to the charging element to detect the configuration (ON, charging the battery, or OFF), and is programmed to activate the power-on procedure or the power-off procedure as a function of the configuration of the charging element. Alternatively, the electronic board is programmed to start the power-on or the power-off procedure in function of a signal of a tilt sensor or inertial sensor (for instance an accelerometer) designed to detect the disconnection of the comparator from the support element.

The switching on and/or off of a single comparator by means of, for example, an inertial sensor, can also be provided independently of the connection to the support element, as a consequence of the transition of the comparator from a rest state (for example resting on a counter) to a moving condition (when the comparator is grasped by the operator).

This allows the user to avoid losing time to act onto a pushbutton or another command to switch the comparator on or off.

The comparator is preferably a wireless device, configured to receive and transmit data through a wireless communication, and this implies the need of having to establish the connection at the right instant while remaining instead the most of the time in a stand-by condition. In a wireless system it is important to positively make use of the condition of absence of communication both to save energy, avoiding that the comparator battery needlessly discharges, and to recharge the comparators. Moreover, the amount of interference and noise induced on other instruments present in the work area (for example other workstations or measuring stations) can be substantively reduced if the comparators are in a stand-by condition.

Reducing such interference and noise also helps to increase speed in the process of establishing a reliable wireless link through a proper protocol and to avoid problems that, in some cases, could also prevent the establishing of such link, if, while attempting to connect, a preset time out is reached. This is an important advantage that contribute to improve productivity by rendering the checking process more quick and reliable.

The activation time is therefore a time that has measurable effects on the productivity of the system.

This issue is resolved by the systems to automatically power on, preferably in advance, the above-described comparators.

The present description also provides a method of use of an apparatus for measuring and checking mechanical parts. In other words, the present description provides a method for measuring (or checking) mechanical parts.

The method comprises a step of programming the processor with a sequence of instructions relating to the use in succession of two or more of the comparators of said plurality.

The method provides that the main processor automatically and selectively activates, as a function of the sequence of instructions, the power-on or power-off procedure for one or more of the comparators of the plurality to guide the user through the operations of measuring and checking the mechanical parts.

It is observed that the comparators are identifiable by the main processor by means of reference codes uniquely assigned to each comparator.

In addition, the main processor, which controls the display on the main screen of the wizard, at every moment knows which comparator is currently used by the user and which comparator will be used afterwards, and when, to replace the previous one.

Therefore, the main processor performs one or more of the following actions:
switch on the selected comparator;
switch off one or more of the other comparators of the plurality, that might be ON at that moment;
inhibit the switching on of other comparators, which are OFF at that moment.

If the apparatus includes the display screen, the main processor carries out these actions concurrently or previously (according to a set period of time) with respect to the display of indications that guide the user to use a certain comparator.

In an embodiment, the method provides, for each comparator, an automatic power on and/or power off step, without the user presses the pushbutton or gives any other command to cause such power on and/or power off.

Such automatic power on and/or power off step is performed by the comparator in response to one or more of the following events (i.e. of the following steps):
change in the orientation of the comparator in space detected by the electronic circuits;
interruption of a step of wireless charging the battery;
reception of a power-on and/or power-off activation command generated by the main processor and transmitted through the wireless connection.

The observations on the comparator that follow apply to all comparators in the plurality of comparators included in the apparatus.

The comparator according to the present description is a manual measuring and/or checking apparatus of a mechanical part.

Preferably, the comparator has a power supply battery on board.

In addition, preferably, the comparator is configured to wirelessly exchange data with electronic equipment external to the comparator (i.e. the comparator is a wireless device).

The comparator has an elongated shape.

The comparator comprises a protective shell, having an internal space. The shell, externally, defines a handgrip, to allow a user to handle it.

The shell has in turn an elongated shape and extends mainly along the longitudinal axis and has a first and a second end. The handgrip is positioned between the first and the second end of the shell, preferably in a substantially intermediate position.

Preferably, the comparator comprises a first block (also referred to as "front end" in the present description), housed, at least partially, in the internal space of the shell.

The comparator comprises a second block (also called a "back end" in the present description), housed in the internal space of the shell. The back end includes the battery and electronic circuits. In the present description, it will also use the expression "electronic board", to indicate said electronic circuits, without that this is meant to limit the scope of the same description.

The electronic board includes a processor, a memory and, preferably, is configured to wirelessly transmit data outside the comparator.

Both the front end and the back end have substantially elongated shape and are aligned along their respective longitudinal axes.

Furthermore, the comparator comprises a probe having at least a movable feeler mounted for example on a cylindrical body (in a so-called "plug gauge") or on a fork body (in a so-called "snap gauge") according to the type of checking to be carried out, for instance, internal or external diameter checking, respectively.

The feeler is configured to touch a surface of the mechanical part of a workpiece to be measured, that is a typically cylindrical seat, in the case of the plug gauge, and a typically cylindrical projection in the case of snap gauge.

Even the probe has a substantially elongated shape and extends along a longitudinal axis.

The comparator also has a position transducer for generating a signal in response to a displacement of the moving feeler.

The probe preferably includes a transmission unit, configured to kinematically connect the transducer to said at least one feeler.

The position transducer may be contained in one of the two blocks, for example the front end, or in the probe, according to the embodiment.

In a possible embodiment, the transmission unit comprises a stem movable along the longitudinal axis and cooperating with the position transducer. In this embodiment, the position transducer is preferably contained in the front end.

The probe is positioned outside the shell. The probe, in one embodiment, is connected to the front end and then is indirectly connected to the shell, or, in another embodiment, it is directly connected to the shell.

When the comparator is assembled, the probe, the shell, the front end and the back end are all oriented, mutually aligned, along the longitudinal axis.

Operatively, the user grasps the comparator and places it with the probe coupled to the mechanical part to be measured in a working position.

When the comparator is in the working position, the moving feeler of the probe interacts with the mechanical part, moves and causes a displacement of the stem of the probe. The stem interacts with the position transducer of the front end, which transmits to the electronic board of the back end a signal representative of the amount of the detected value, for example the measure of a diameter, or the difference between the diameter of the part to be measured and a reference diameter.

In general, the detected data updates substantially in real time, varying as a function of a movement of the comparator that is drives by a movement of the hand that grips the comparator itself.

When the user decides to acquire the data detected and to carry out a measurement, he presses a pushbutton (or any other command) present on the comparator. The pressure on the pushbutton causes the sending of a command to the circuit board, which acquires the data and transmits it from the comparator (and/or save it to a memory).

The comparator is designed to be grasped by the user with a single hand. Typically, the user presses the pushbutton with the same hand that holds the comparator (preferably using the thumb).

The comparator also includes an interface intended to let the user see information on the operation of the comparator.

In an embodiment, the interface includes an LED or another light indicator, which indicates that the comparator is powered on.

In an embodiment, the interface includes a display on board the comparator. The display is in addition or alternative to the LED. The display is configured to display numbers, messages and icons. In particular, the display is connected to the electronic board for displaying in real time the data concerning the variable detected by the comparator.

In an embodiment, the comparator comprises a first and a second pushbuttons. The pushbuttons are inserted in respective external housings defined by the shell, "external" because they are formed in the outer surface of the shell, more specifically of a wall of the shell, so that the pushbuttons can be accessed from the outside by the hand that holds the comparator. These first and a second pushbuttons have the same function.

Preferably, the pushbuttons are positioned longitudinally spaced from each other, near opposite ends of the handle, so increasing the ergonomics of the comparator. In fact, the user may have the need to take the comparator according to either a first or a second orientations opposed to each other. The presence of two pushbuttons, one proximal to the first end of the shell and the other proximal to the second end of the shell, allows the user to conveniently operate a pushbutton in all gripping modes.

Preferably, the pushbuttons are aligned with each other, for example along a generatrix of the substantially cylindrical surface of the shell.

Preferably, the pushbuttons are also aligned with the display.

This enhances the ergonomics and comfort of use of the comparator, allowing the user to see the figure detected and, simultaneously, press a pushbutton, without looking away from the comparator and in any disposition or grasping arrangement.

In an embodiment, the electronic circuits of the comparator are programmed to rotate the image displayed on the screen, in response to a command given by the user by means of a control member (for example, a pushbutton) and/or automatically.

This improves the convenience of use of the comparator, because it facilitates the reading of the data detected and displayed on the display, allowing you to adjust the orientation (in the plane defined by the display) of the displayed image depending on the arrangement of the comparator relative to the user.

The automatic rotation of the displayed image, for example in function of a signal of an inertial sensor on board the comparator, allows the user to save time and effort to manually control the rotation thereof.

The probe is interchangeable, that is it can be removed and replaced with a different probe. This feature renders particularly versatile and practical the comparator.

The present description provides a particularly advantageous solution for the replacement of the probe.

The comparator comprises a fastening unit, operatively interposed between the probe and the front end, as well as between the probe and the first end of the shell.

The fastening unit preferably has cylindrical geometry with a longitudinal axis.

The fastening unit is configured to be fixed to the probe. Preferably, the fastening unit and the probe have respective threaded portions, to define a threaded coupling. This makes robust and stable the comparator. The fastening unit is configured to be fixed to the front end or to the first end of the shell. Preferably, the fastening unit has a flange radially extending about its longitudinal axis, for the connection to the front end. The fastening unit also includes one or more removable locking members, configured to fix the fastening unit—more specifically the flange of the fastening unit—to the front end into a plurality of angular positions about the longitudinal axis. It is observed that the connection of the flange to the front end involves a connection—at least an indirect connection—of the flange to the first end of the shell.

Preferably, the fastening unit also includes a centering element, for example, an annular projection, configured to rotably couple to the front end about the longitudinal axis. Such centering element has the function to ensure a precise alignment along the longitudinal axis between the probe—which the centering element is fixed to—and the front end fixed to the shell.

This solution ensures particularly reduced overall dimensions (especially in the longitudinal direction) and allows the user to perform particularly simple and rapid operations to rotate and adjust the angular arrangement of the probe about the longitudinal axis with respect to the shell.

As a consequence, the user can easily choose and fix the angular position of the probe with respect to the shell, taking for instance as a reference the alignment line on which the pushbuttons and the screen lie.

This solution, featuring the high robustness and reliability typical of the threaded connections, also allows reduction of costs and improvement in the reparability of the comparator.

As regards the robustness and reliability of the comparator, the present description provides other solutions relating to other aspects of the comparator, adoptable in mutual combination or individually, in addition to the other aspects mentioned in the present description.

In an embodiment, the pushbutton or pushbuttons are positioned in external housings defined by the shell, which form blind openings, open only on the outside of the shell. In other words, a wall of the shell defining the external housing is physically interposed between such external housing and the internal space of the shell, to physically separate the pushbutton from the internal space. The pushbutton is also electrically insulated from the front end and the back end. In fact, the wall of the shell defining the external housing is made of a dielectric material, such as a plastic material, for example a polymer.

This increases the comparator's protection against the entry of dust, liquids or other external agents and contaminants inside the comparator, that is into the internal space of the shell, where the most sensitive electrical and electronic components are located.

The absence of electrical connections between the external part of the shell, where the pushbuttons are located, and the internal space also improves the electromagnetic compatibility of the comparator.

In this embodiment, the pushbutton transmits the control signal to the electronic board (located in the internal space of the shell) via a contactless coupling. For example, the pushbutton is magnetically coupled to a control circuit located inside the shell, to vary an electric parameter of the circuit (for example an inductance). According to an alternative solution, the pushbutton includes an RFID transmitter or receiver (for example a passive element), adapted to interact with a corresponding receiver or transmitter placed inside the shell, in which each transmitter and corresponding receiver elements are positioned on opposite faces of the wall that separates the external housing from the internal space of the shell.

This solution allows to obtain, with relatively low production costs, a comparator featuring a sealing degree greater than or equal to IP65.

In an embodiment, the shell includes a membrane that is permeable to gases but impermeable to liquids, interposed between the internal space and an environment external to the comparator. Preferably, the membrane is positioned in a closure cap of the second end of the shell, in the vicinity of the back end.

This solution increases the robustness and the convenience of use of the comparator, because it allows to maintain a good level of protection of the comparator from entry of dust and liquids and, at the same time, to avoid the risk of condensation in the internal space (for example on the display). Condensation may form if the comparator is assembled and sealed in a relatively wetter and warmer environment than the environment in which the comparator is then used.

In an embodiment, the comparator has a pushbutton positioned near the first end of the shell, for example at a distance from the first end less than 15 mm.

This increases the robustness and reliability of the comparator, because it reduces the possibility of breakage due to excessive stress (bending moment) applied to the connection area between the probe and the front end when the user presses that pushbutton.

The specific fastening unit that is screwed to the probe allows to position the probe at a particularly small distance from the shell; so further reducing the risk of breakage.

In an embodiment, the shell comprises a core (preferably made of a resistant metallic material) incorporated in a body made of a plastic material and defining a matrix encapsulating the core or part of it.

The core has an engagement surface that can be fixed to the front end at the first end of the shell.

The core is elongated longitudinally, from a first end positioned at the first end of the shell, to a second end positioned in an intermediate zone of the shell and enclosed in the plastic body of the shell itself.

This further increases the robustness and reliability of the comparator, with particular reference to the connection area between the front end and the shell.

With regard to the simplicity and efficiency of maintenance, repairability and assembly of the comparator, the present description provides further advantageous solutions, relating to other aspects of the comparator, adoptable in mutual combination or individually, in addition to the other aspects mentioned in the present description.

According to an embodiment, the internal space of the shell has a first internal housing, for housing the front end, and a second internal housing, for housing the back end.

Each internal housing defines a guide for the longitudinal sliding of the respective block, from the respective opening of the shell towards a central area of the shell. A working position of each of the blocks is defined by mechanical references integral with the shell.

The front end, or first block, has a first plurality of electrical contacts and the back end, or second block has a second plurality of electrical contacts to be connected to the electrical contacts of the first plurality.

Said electrical contacts are positioned on corresponding ends of the respective blocks, which ends are operatively facing each other, when the front and back ends are housed in the shell.

The front end and the back end have different cross-section. The first and the second external housings have corresponding different sections.

At least one of said first and second plurality of electrical contacts are movable by elastic deformation along the longitudinal axis.

This makes the electrical connection between the front end and the back end particularly easy and quick.

Also the use of the wireless pushbutton coupled to the second block (back end) simplifies the assembly of the comparator, because it reduces the number of connections to be performed.

Even the adoption of the above-mentioned fastening unit simplifies the assembly, with reference to the probe to be connected to the front end.

The core incorporated in the plastic body of the shell facilitates and strengthens connection of the first block (front end) to the shell.

The present description also provides a method of use of the comparator.

Such method of use provides, according to a possible embodiment, the contactless transmission of commands from the pushbuttons to the electronic board.

According to another embodiment, the method provides the rotation of the image displayed in the screen on the comparator, preferably automatically (but possibly also through manual controls).

According to another embodiment, the method of use provides the adjustment of the angular position of the probe about the longitudinal axis, with respect to the shell, by means of unlocking, rotation and locking of the fastening unit to the front end.

According to another embodiment, the method includes the automatical power on or off of the comparator, without the user gives specific controls, e.g. by means of the pushbuttons.

According to another embodiment, the method provides the humidity regulation in the internal space of the shell, by balancing the same with the humidity of the environment external to the comparator, through the membrane allowing gases but not liquids to pass through.

Furthermore, the present description also refers to a method for assembling the comparator, e.g. for the purpose of maintenance.

According to an embodiment of the assembling method of the present invention, an electrical connection of the front end (first block) to the back end (second block) internally to the shell, takes place by compressing resilient electrical contacts, more specifically retractable contacts that are elastically displaceable in a longitudinal direction along which the two blocks are aligned, or a radial direction.

According to another example, the assembling method provides coupling of the front end and the back end to the shell by slidably inserting the blocks along the longitudinal axis of the shell in corresponding housings that are properly shaped to define sliding guides, and subsequent attachment to the shell.

According to another example, the assembling method involves connecting the probe to the front end (first block) by screwing the probe to a fastening unit, which is in turn fixed to the end of the shell or to the front end by means of a flange that is angularly adjustable by rotation about to the longitudinal axis.

According to another example, the assembling method includes fixing the front end to the shell by applying internal screws or other fastening elements between a radial expansion of an end of the first block and a metal core embedded in a plastic material matrix to form the shell.

Furthermore, the present description also refers to a shell for a comparator for measuring and/or checking a mechanical piece.

The shell, according to an embodiment, has two or more external housings or seats for housing as many pushbuttons.

According to an embodiment, the shell has at least an external housing for a pushbutton, which is defined by a wall of the shell constituting a continuous barrier (mechanical and electrical) between the external housing of the pushbutton and the internal space of the shell.

According to an embodiment, the shell has a metal core embedded in a matrix of plastic material.

According to an embodiment, the shell has a membrane that is impermeable to liquids but permeable to gases.

BRIEF DESCRIPTION OF THE DRAWINGS

A recognition system for a measuring apparatus, and a relative method, to detect the correct positioning of a removable device with respect to a stationary part according to the invention will now be described with reference to the accompanying drawings, given only by way of non-limiting example, in which:

FIG. 13 shows the shell of the comparator of FIG. 10, in a perspective view;

FIG. 14 shows the shell of FIG. 13, sectioned along a longitudinal plane;

BEST MODE OF CARRYING OUT THE INVENTION

Figure 1:
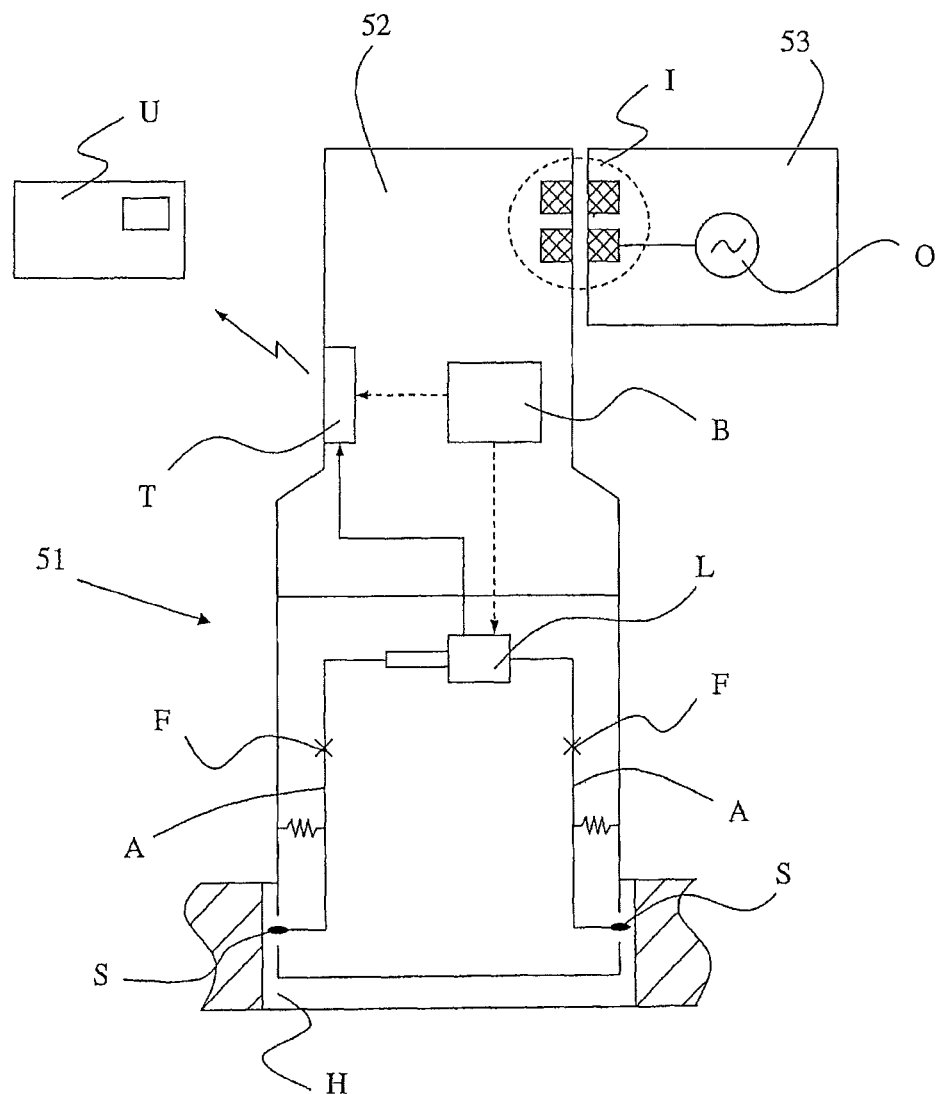
FIG. 1 is a schematic view of a measuring apparatus with an inductive charging device of known type.

FIG. 1 schematically shows a measuring apparatus 51, in a measuring assembly of a known type, provided with a removable device, for example a comparator, and more specifically a plug gauge, 52 for checking the inner diameter of a hole H, and a stationary part 53 comprising an inductive charging device. The plug gauge 52 comprises a measuring armset with at least an arm movable about a fulcrum and at least a feeler fixed to the arm which is configured to contact the surface of the hole H. In the comparator 52 shown in the figure, the armset includes a pair of arms A movable about fulcrums F, and feelers S fixed to arms A which contact the surface of the hole H. A transducer L provides electrical signals responsive to a mutual position of the feelers S to a transmission unit T comprising for example an antenna that in turn transmits corresponding wireless signals to an external processing unit U. A battery B feeds both the transducer L and the transmission unit T. The battery B is charged when necessary approaching the comparator 52 to the stationary part 53 containing a power supply unit with an oscillator O, through an inductive coupling I with primary and secondary windings arranged, respectively, in the stationary part 53 and in the comparator 52.

Figure 2:
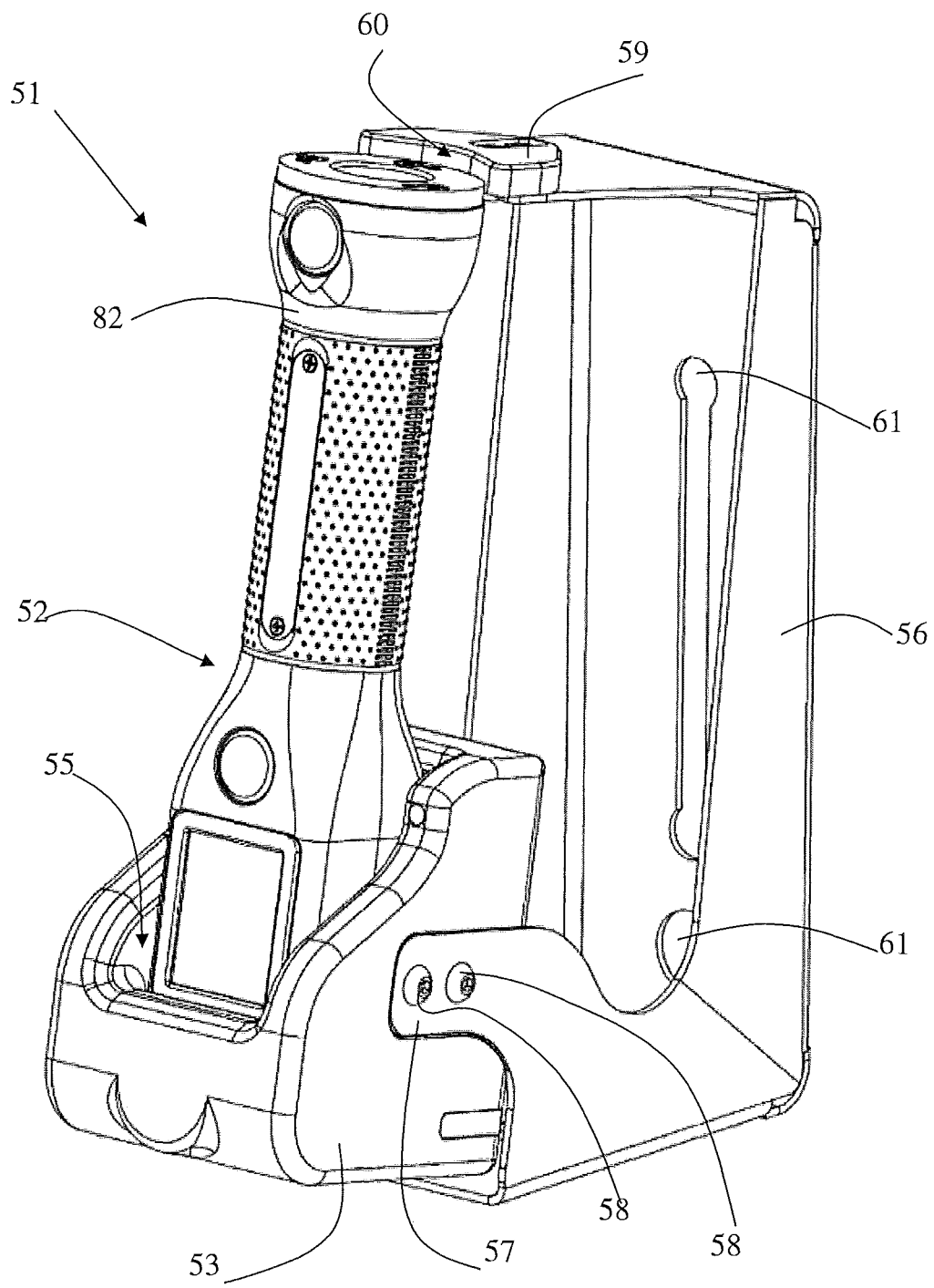
FIG. 2 is a perspective view of a part of a measuring apparatus comprising a fastening structure.

FIG. 2 shows a preferred embodiment of a measuring apparatus that has a structure similar to that of FIG. 1, in which the stationary part, or stand, 53 comprises a housing for the comparator 52 and an inductive charging device. The comparator 52, for manual use, comprises a handle 82 having a wall 54, to which a measuring probe, not shown in FIG. 2, is connected. The measuring probe substantially corresponds to the lower part of the comparator 52 shown in FIG. 1. The handle 82 houses a battery that supplies the transmission system, the latter comprising an antenna. The stand 53 is substantially L-shaped and is provided with a first mechanical reference for the comparator, in particular a shaped seat 55 in which a portion of the handle 82 which includes a winding 81 is inserted. The power supply unit is housed in the stand 53 in correspondence of a vertical wall of the stand 53 itself. When the comparator 52 is inserted in the seat 55 of the stand 53, the winding 81 inside the comparator 52 is facing a winding, or primary winding, 80 present in the stand 53.

The handle 82 of the comparator shown in FIG. 2 is provided with a display for displaying data, and two push-buttons for manual activation of the comparator, but can present different characteristics.

The embodiment shown in FIG. 2 also comprises a fastening structure 56, for example made of steel, that is connected to the stand 53 and supports it. The fastening structure 56 is substantially C-shaped and defines a vertical central portion, a lower portion and an upper portion. The lower portion of the fastening structure 56 comprises, at a free end thereof, two elements 57 that are properly shaped to allow the connection of the stand 53, between them, to the structure 56 through connection means such as, for instance, screws 58 coupled to holes at side walls of the stand 53. The stand is connected to the fastening structure 56 in such a way that most of the base of the former is arranged out of the fastening structure 56. In such a way, the fastening structure 56, which is made of steel, does not substantially interfere with the wireless transmission between the antenna of the comparator and a processing and display external unit such as the unit U of FIG. 1. A second mechanical reference element 59 is fixed in an adjustable manner, for example by means of screws, to the fastening structure 56, at a free end of the upper portion. The second mechanical reference element 59 comprises a V-shaped reference seat 60 where the end of the handle 82 opposite to the one inserted in the seat 55 of the stand 53 rests. In order to ensure that the handle 82 is resting in the V-shaped reference seat 60, the stand 53 is fixed to the fastening structure 56 so that it is slightly inwardly inclined towards the fastening structure 56. The inclination of the stand 53 and the two mechanical references, i.e. the seat 55 of the stand 53 and the V-shaped reference seat 60 of the fastening structure 56, help to increase the stability of the comparator 52 with respect to accidental movements and unwanted detachment due for example to knocks.

The fastening structure 56 has holes and slots 61 in correspondence of both the vertical central portion and the lower portion so as to allow for the attachment respectively to a vertical wall and to a support plane.

Although the fastening structure 56 shown in FIG. 2 grants a number of advantages, it is possible to omit this structure and, for example, place the stand 53 directly on a surface, for example on a work bench.

In a measuring assembly according to the invention a recognition system can be associated to a measuring apparatus such as that described above. The recognition system is used to detect the correct positioning of the removable device, more specifically of the measuring apparatus or comparator, with respect to the stationary part. Such recognition system comprises a field source placed in the fixed part, a matching element placed in the comparator and adapted to alter the propagation of the field generated by the field source and at least one sensor of a known type fixed to the stationary part to detect the field and generate a detection, or a non-detection, signal which depends on the propagation of that field. The system also comprises a processing unit that is connected to the sensor and provides an indication of correct positioning of the comparator on the basis of the signal generated by the sensor.

Figure 3:
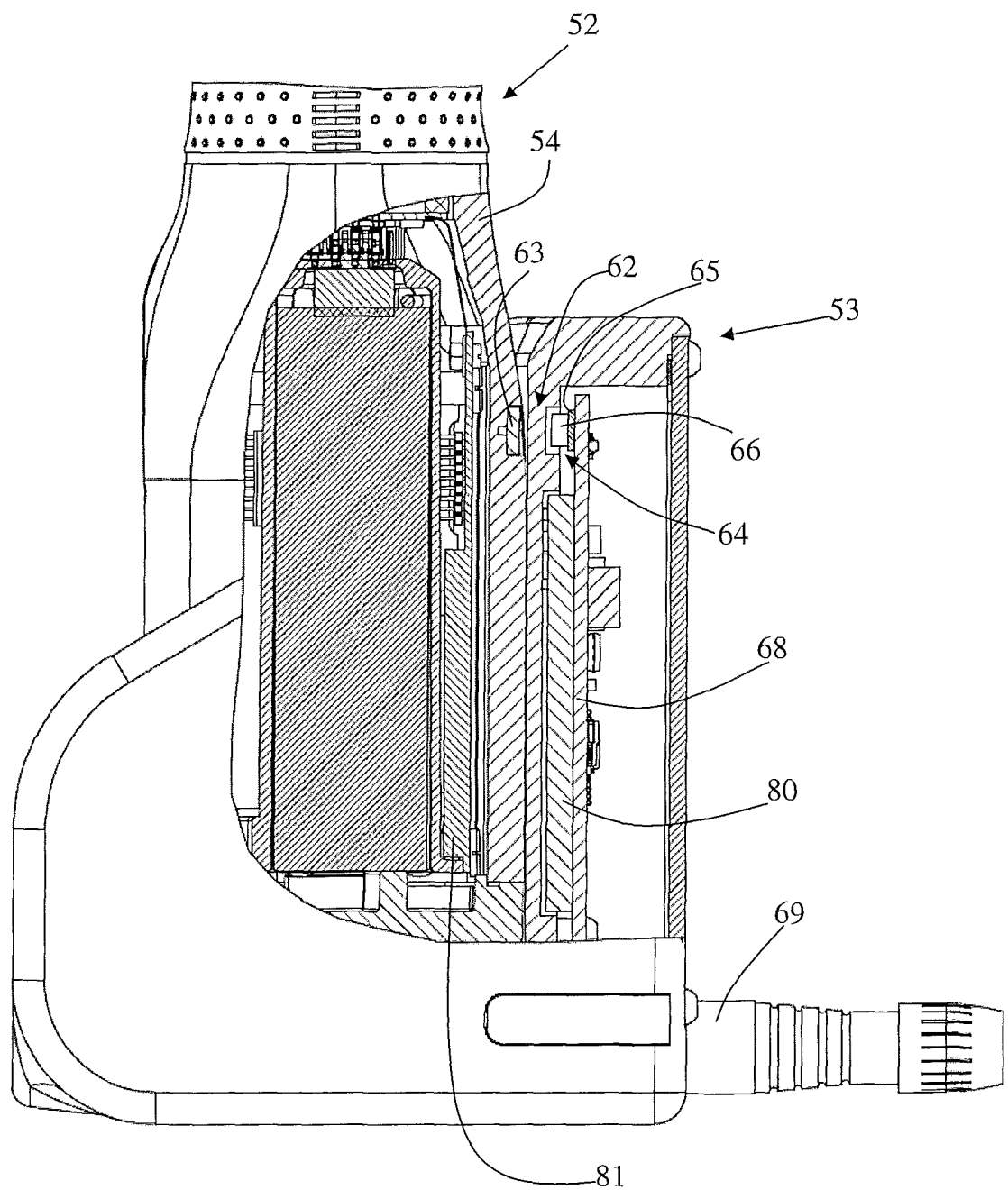
FIG. 3 is a partially cross-sectioned view of a portion of the measuring apparatus.

The measuring apparatus shown in FIG. 2 comprises a recognition system of the magnetic type, according to the preferred embodiment of the invention, wherein the field source and the matching element include ferromagnetic elements, one placed in the removable device 52 and the other disposed in the stationary part 53. FIG. 3 shows a partial section of the handle 82 of the comparator 52 and of the stand 53 shown in FIG. 2 in which the recognition system is partially shown and indicated as a whole with the reference number 62.

The ferromagnetic element arranged in the handle 82 of the comparator 52, is indicated with reference number 63 and includes an independent element fixed to the device in correspondence of a suitably shaped and sized cavity present in the wall 54. The ferromagnetic element 63 is, for example, glued and fitted into the in the cavity of the wall 54.

Figure 4:
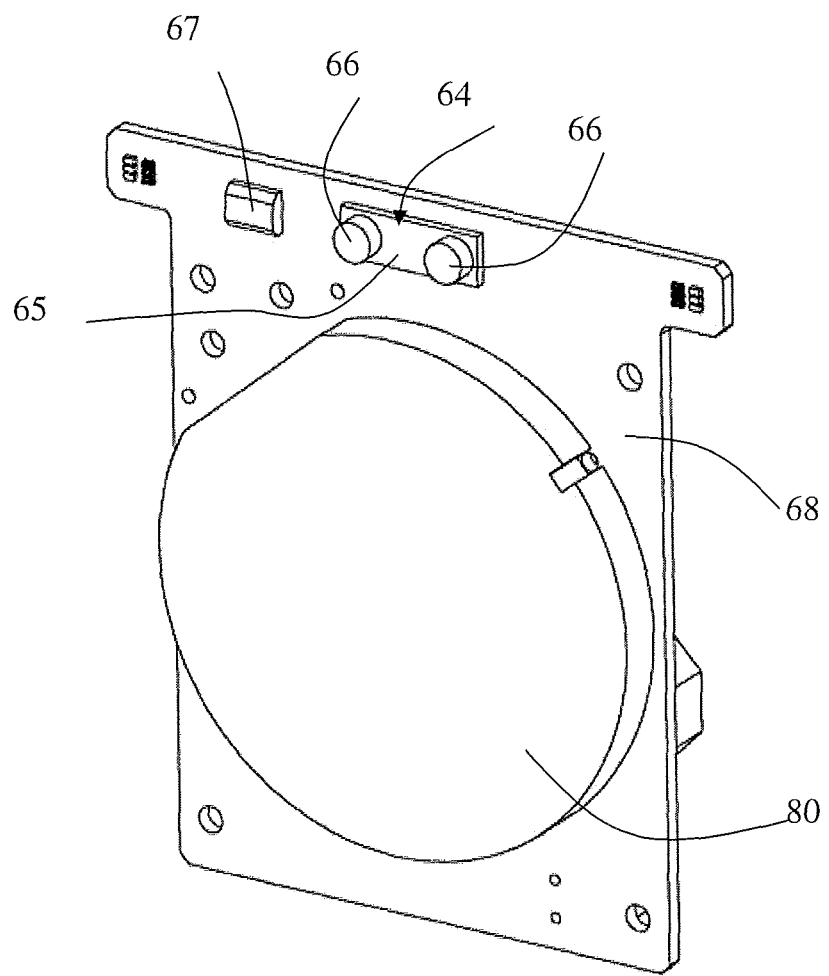
FIG. 4 is a perspective view of a component of the measuring apparatus and of a part of the recognition system according to the invention.

The ferromagnetic element arranged in the stationary part 53 comprises a C-shaped core 64 with two opposite poles. The core 64 is fixed to an electronic board 68 present inside the stand 53 that also includes the power supply unit. The board 68 is visible in section in FIG. 3, while FIG. 4 shows its side comprising the core 64 and the winding 80. The board 68 is fixed in a special shaped cavity formed inside the vertical wall of the stand 53.

Two magnets of opposed polarities are arranged at the ends of the core 64. In the preferred embodiment shown in FIGS. 3 and 4, the core 64 comprises an elongated plate 65 made of ferromagnetic material on a surface of which are fixed, each at one end, two permanent magnets 66 which, as known, require no power supply.

According to an alternative, less advantageous, embodiment, the core 64 with permanent magnets 66 is replaced by an electromagnet, in particular including a C-shaped ferromagnetic core around which an appropriate number of coils fed with an alternating current is wrapped. This alternative embodiment allows to avoid the side effects of permanent magnetization of the ferromagnetic structure due to the constant magnetic field generated by the permanent magnets, but increases the complexity of the system and requires additional power supply.

The ferromagnetic element 63 disposed in the comparator 52 and the core 64 arranged in the stand 53 are suitably positioned so as to be mutually facing when the comparator 52 is correctly positioned relative to the stand 53.

As discussed in detail below, in order to allow the recognition system to properly operate, it is necessary that the maximum distance between the stand 53 and the comparator 52 does not exceed a certain limit. The presence of at least one mechanical reference for the comparator 52 allows to ensure this condition.

A magnetic field sensor 67, for example a solid-state sensor or a Hall effect switch, is placed in the stationary part 53 in the vicinity of the core 64. The sensor sends to a processing unit (not shown) a logic signal indicative of the detection or non-detection of the magnetic field generated by the core 64. On the basis of the signal received from the sensor 67 and in response to known types of processing, the processing unit determines whether the comparator 52 is present and correctly positioned with respect to the stationary part 53, or if it is not present or incorrectly positioned, and provides relative information.

Figure 5A:
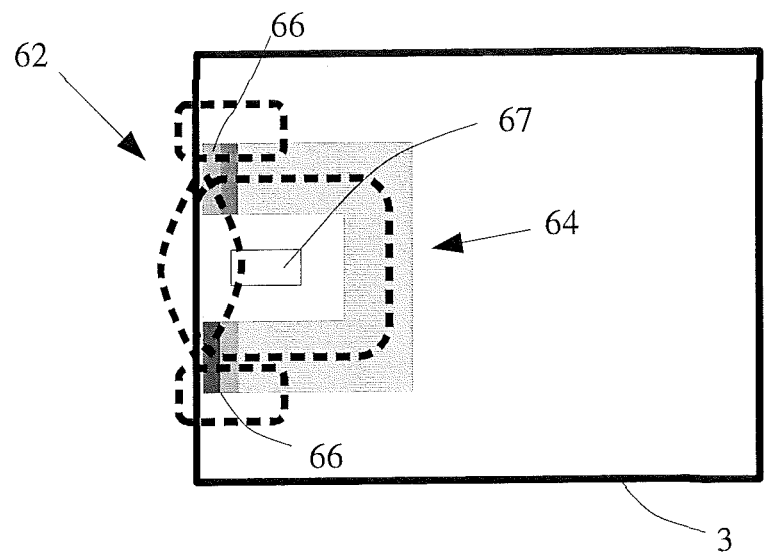
FIGS. 5A and 5B are very schematic representations of the operation of a first embodiment of a recognition system of the magnetic type in a measuring assembly according to the invention.
Figure 5B:
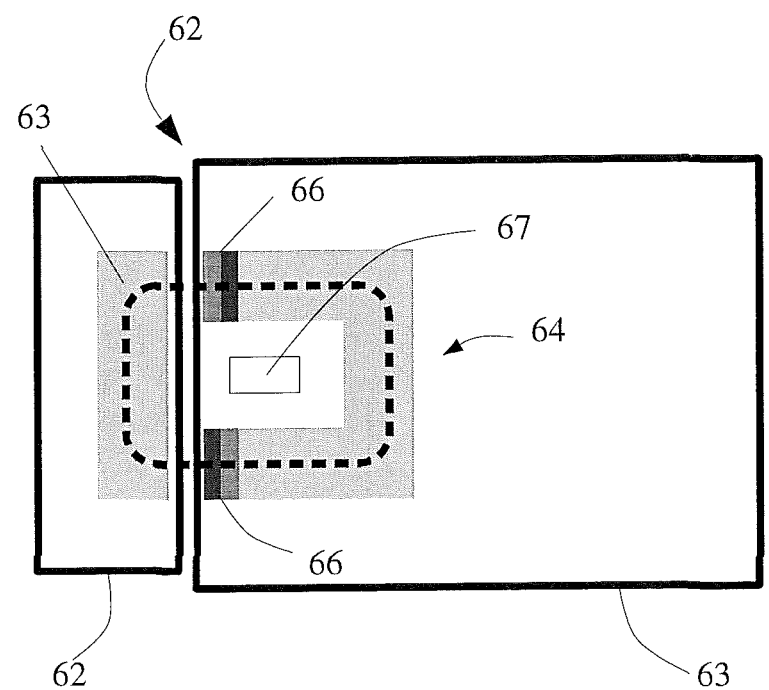

The sensor can be positioned in an intermediate position between the two ends of the core 64 in correspondence of the area enclosed by the ends of the latter, as shown schematically in FIGS. 5A and 5B. In this case, the core 64 should be properly sized in order to ensure room enough to place the sensor 67, while the ends of the core 64 should be at a limited distance from each other to ensure the generation of a properly dimensioned magnetic field.

Figure 6A:
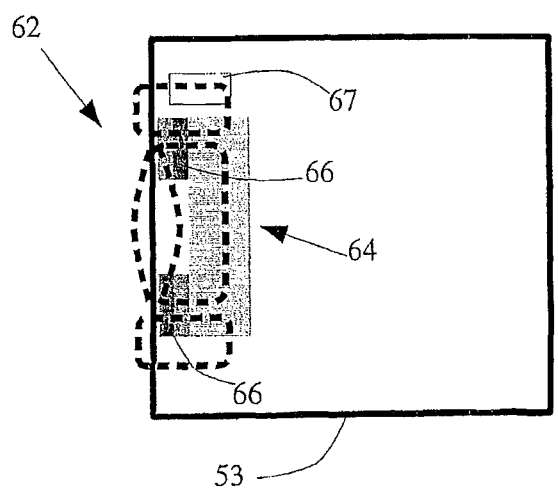
FIGS. 6A and 6B are very schematic representations of the operation of a second embodiment of a recognition system of the magnetic type in a measuring assembly according to the invention.
Figure 6B:
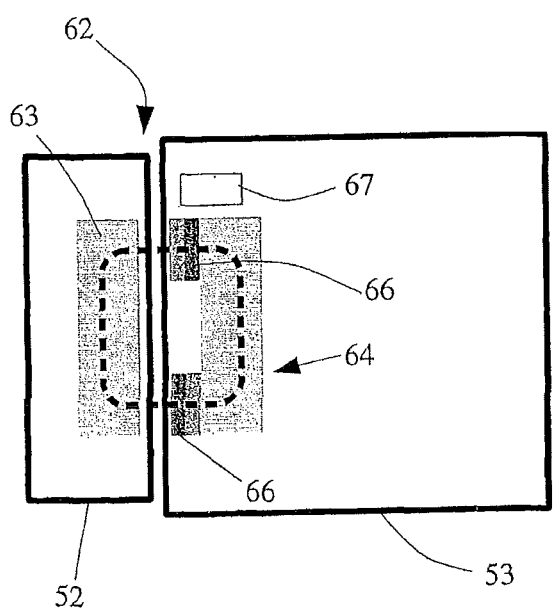

Alternatively, according to a preferred embodiment, the sensor 67 can be placed alongside the core 64, outside of the latter, near one of the two ends, as shown in FIGS. 6A and 6B. This arrangement of the sensor 67 allows to obtain a ferromagnetic element more compact by considerably reducing the overall dimensions and does not require, in addition, a particular dimensioning of the core 64.

To improve the accuracy in detection of the correct positioning of the removable device with respect to the stationary part, it is possible to use two sensors each positioned in the vicinity of one of the ends of the core. In addition, by connecting in parallel the outputs of the two sensors 67, it is possible to increase the reliability of the recognition system, guaranteeing the proper operation even in case that one of the two sensors is not functioning correctly.

Figure 7:
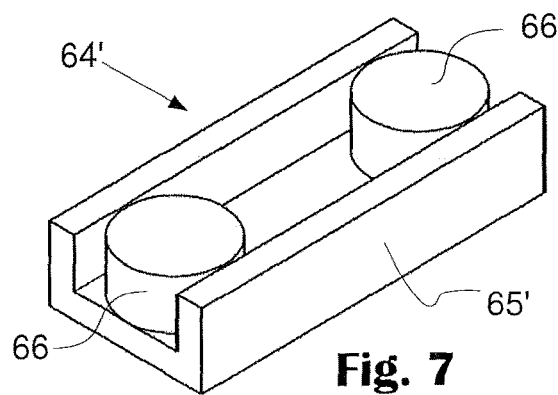
FIG. 7 is a very schematic representation of an alternative embodiment of a component of the recognition system in a measuring assembly according to the invention.

According to an alternative embodiment shown in a very schematic way in FIG. 7, the core 64' comprises a laminar element of ferromagnetic material, or plate, 65' with two folded opposite edges which partially enclose the magnets 66. This variant allows to delimit the propagation of the magnetic field in correspondence with the folded edges of the plate 65' without altering the propagation in the direction extending towards the sensor. This allows to increase the accuracy with which the correct positioning of the comparator 52 is determined. In fact, thanks to the particular shape of the core 64', the propagation of the magnetic field in the matching element 63 disposed in the comparator 52 takes place only when the matching element 63 and the core 64' are mutually centered. In this way it is possible to avoid the risk of false detections due to an undesired propagation of the magnetic field in the matching element 63 even when the latter is not in the correct position, that is it is off-centered with respect to the core 64', for example in the case in which, with reference to FIG. 2, the comparator 52 is positioned higher in the stand 53, not properly seated in the seat 55.

According to an alternative embodiment, it is possible to have a pair of magnets coupled to the ferromagnetic, matching element 63 disposed in the comparator 52. Such pair of magnets in turn generate a magnetic field so as to increase the interaction between the magnetic field generated by the core 64 (or 64') and that generated by the magnets present in the comparator 52.

In case of application of the recognition system in a measuring apparatus that includes a non-inductive type charging device, the ferromagnetic element arranged in the removable device may be, according to an alternative embodiment, an integral part of the same device, for example a portion of the handle if this is made of ferromagnetic material.

The recognition system in a measuring assembly according to the invention generally operates as follows. The field source disposed in the stationary part generates a field whose propagation undergoes an alteration which depends on the position of the matching element. The alteration of the field propagation is detected by a sensor that, consequently, generates a detection signal or a non-detection signal. Based on this detection or non-detection signal, an indication on the positioning of the removable device with respect to the stationary part is provided.

The operation is now described more in detail with reference to the preferred embodiment comprising the permanent magnets. The description that follows expressly mentions core 64 but it is fully valid for core 64' of FIG. 7, too. FIGS. 5A, 5B, 6A and 6B illustrate in a schematic and extremely simplified way two different operating conditions. The dotted lines indicate the path followed by the flux lines of the magnetic field and hence show the propagation of the magnetic field.

As is known, the core 64 that is arranged in the stand 53, with the permanent magnets 66 at the ends, generates a magnetic field. The flux lines of the magnetic field always follow the path featuring the lower reluctance. More specifically, if a ferromagnetic element is present in the vicinity of a field source, the flux lines do close in such ferromagnetic element rather than in air.

When the comparator 52 is not present or is not correctly positioned with respect to the stationary part 53 the magnetic field that is generated by the core 64 is propagated in the air. In this case, as shown in FIGS. 5A and 6A, the path of the flux lines of the magnetic field, that close upon themselves, passes through both the area between the two ends of the core 64 and outside areas close to such ends of the core 64. As a consequence, in both embodiments of FIGS. 5A and 6A the magnetic field passes through, and is detected by, the sensor 67.

Instead, when the comparator 52 is correctly positioned in the stand 53, the ferromagnetic elements, namely the matching element 63 present in the comparator 52 and the core 64 arranged in the stand 53, provide a preferred path for the flux lines of the magnetic field, since its reluctance is by far lower with respect to air. In other words, when the comparator 52 is present and properly positioned, more in particular when the ferromagnetic element 63 is located in a certain position, that is facing the core 64, the presence of ferromagnetic element 63 causes an alteration in the propagation of the magnetic field generated by the core 64 with respect to the case where such element is absent, more specifically the flux lines of the magnetic field close upon themselves through a path including the matching ferromagnetic element 63.

In this circumstance, as shown in FIGS. 5B and 6B, the sensor 67, both in the case in which it is placed between the two ends of the core 64 (FIG. 5B) and where it is positioned alongside one of the two ends (FIG. 6B), does not detect the magnetic field (that is the strength of the magnetic field, if any, is below a predetermined threshold and cannot be detected by the sensor 67), and outputs a non-detection signal. For the sake of simplicity, FIGS. 5B and 6B do not show the flow lines that still reach the sensor 67 but are not detectable (strength of the magnetic field too low, below threshold).

In short, the detection by the sensor 67 of the magnetic field generated by the core 64 indicates an absence of the removable device or an incorrect positioning of the latter with respect to the stationary part 53, while a lack of detecting, or "non-detecting", the magnetic field of the core 64 by the sensor 67 indicates that the removable device 52 is present and correctly positioned.

In order that the recognition system properly operates, the removable device 52 need not necessarily be in contact with the stationary part 53. However, it is important that the distance between the two is sufficiently small so as to avoid the dispersion of the magnetic field and ensure that the propagation of the latter is altered, that is that the relevant flux lines pass through the ferromagnetic element 63 present in the removable device 52. Otherwise, as explained previously, the magnetic field would be detected by the sensor 67, and an indication of lacking or incorrect positioning of the removable device 52 would be provided.

As previously mentioned, an inductive charging system for the battery of the comparator 52 can be associated to the recognition system. The two systems can be associated in such a way that when the recognition system detects the presence and the correct positioning of the comparator 52, the charging device is automatically activated.

Figure 8:
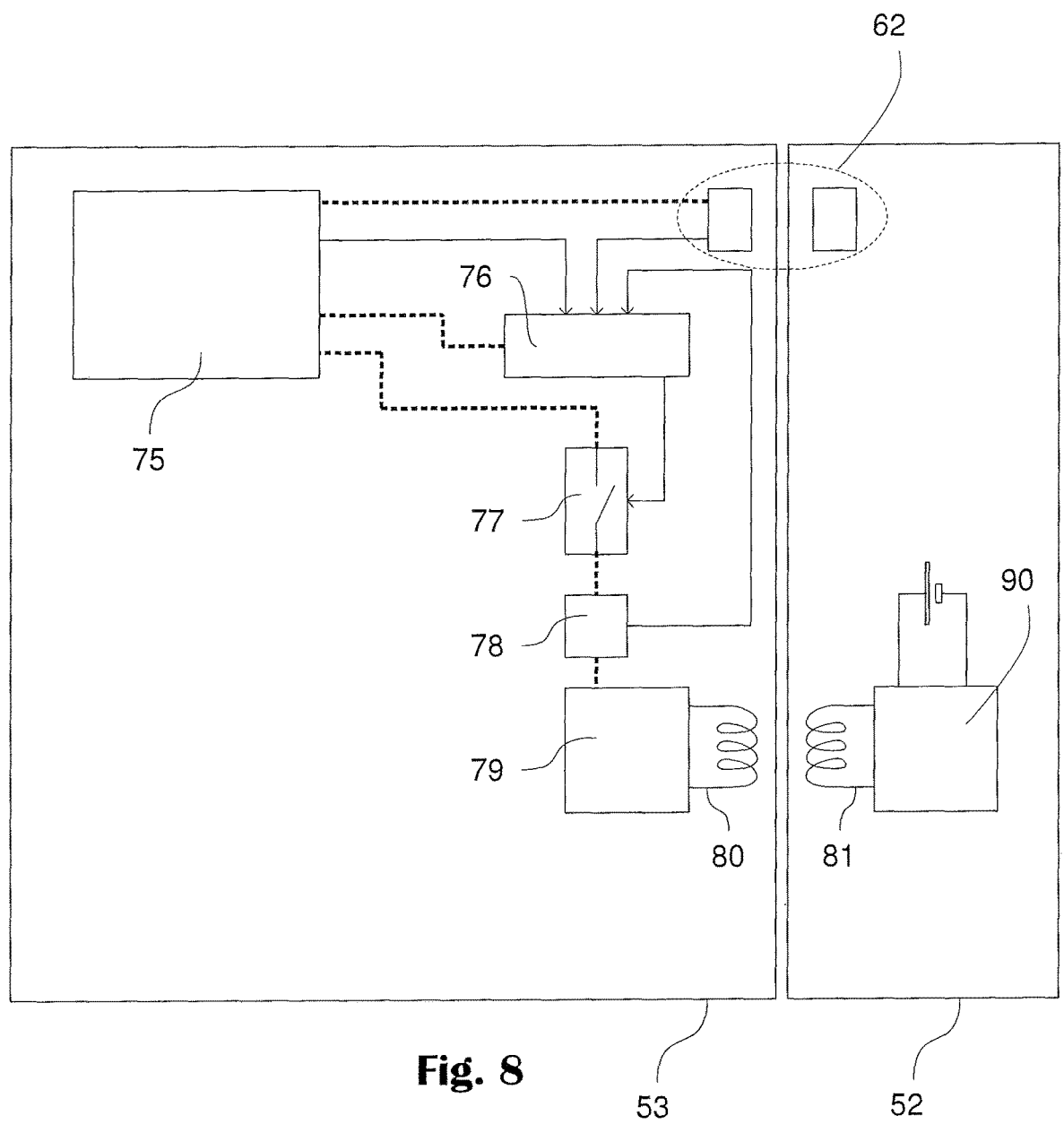
FIG. 8 is a block diagram of circuit components of the measuring apparatus in a measuring assembly comprising the recognition system according to the invention.

FIG. 8 shows a block diagram of circuit components of the measuring apparatus 1. The circuit components are defined, for example, in the electronic board 68 housed in the stand 53 where the recognition system 62, shown schematically by means of two blocks, and the charging device are integrated. The current supply for recharging the battery (block 90) of the comparator 52 is controlled by a processing unit, or logic unit 76. In the board 68 are present also a voltage regulator 75 that is direct current supplied through a cable shown in FIG. 3 and indicated with the reference 69, and that provides a fixed DC voltage of appropriate value, a solid state switch 77 whose opening and closing are controlled by the logic unit 76 as a function of the signal generated by the sensor 67 of the recognition system, an overload sensor 78 for the control of the current level winding 80, and a power supply circuit 79 for the winding 80.

The logic unit 76 receives information about the correct operation of the voltage regulator 75. The logic unit 76 also receives from the recognition system 62, more specifically from the sensor 67, according to the previously described operation, a non-detection signal indicative of the presence of the comparator 52 and of its correct positioning, or, on the contrary, a detection signal indicative of the lacking or incorrect positioning of the comparator 52. Only in the first case, that is in the case in which the non-detection signal of the sensor 67 indicates that the comparator 52 is properly positioned with respect to the stand 53, the logic unit 76 commands the closure of the switch 77 and it is possible to pass to the next step, that is to the control of the winding 80 overload by the overload sensor 78. In the absence of overload, the power supply of the power supply circuit 79 of the winding 80 is maintained. On the contrary, if overload is sensed by sensor 78 the power supply is interrupted and the control is repeated periodically, for example every 3 or 4 seconds, until there is no longer overload. Once powered, the winding 80 generates a magnetic field which, interacting with the magnetic field induced in the winding 81 of the comparator 52, charges the battery 90 of the latter.

Unlike known systems, such as that described in the U.S. Pat. No. 4,031,449 patent, the inductive coupling winding 80 is not continuously powered. The logic unit 76 controls, through the switch 77, the passage of current to the winding 80 of the stand 53, and allows the power of the winding 80 only when the recognition system detects the presence and proper positioning of the removable device.

To provide a visual indication of the operation of the charging device and/or of the correct positioning of the comparator 52, indicators of different colors may be present in the stand 53. Such indicators may be LEDs, which indicate, for example, the correct operation of some components, or on the contrary their malfunction, and the state of the battery charge.

The recognition system described with reference to FIGS. 2-7 is of the magnetic type. According to an alternative embodiment, it is possible to employ a recognition system of the optical type, such as that shown for example in FIGS. 9A and 9B and indicated with reference number 70.

A field source, comprising an emitter 71, for example an LED, is arranged in the stand 53 and generates an electromagnetic field, more precisely, a light beam, for example in the infrared band. A sensor, comprising a receiver 72, for example a photodiode, is arranged in the stand 53 at the same level of the emitter 71 and at a determined distance from the latter. Emitter 71 and receiver 72, that are powered by a direct voltage source, not shown, are set in appropriate seats in the external wall of the stand 53 so that they can face the comparator 52 when the latter is properly positioned in the stand 53.

A matching element, for example an optical guide 73 that can include appropriate known components, such as an optical fiber, is disposed in the comparator 52. The optical guide 73 is, for example, U-shaped and is fixed in a suitable seat in the wall 54 of the comparator 52 so that its free ends are both in communication with the outside and that, when the comparator is properly positioned in the stand 53, one end is facing the emitter 71 and the other end the receiver 72.

Figure 9A:
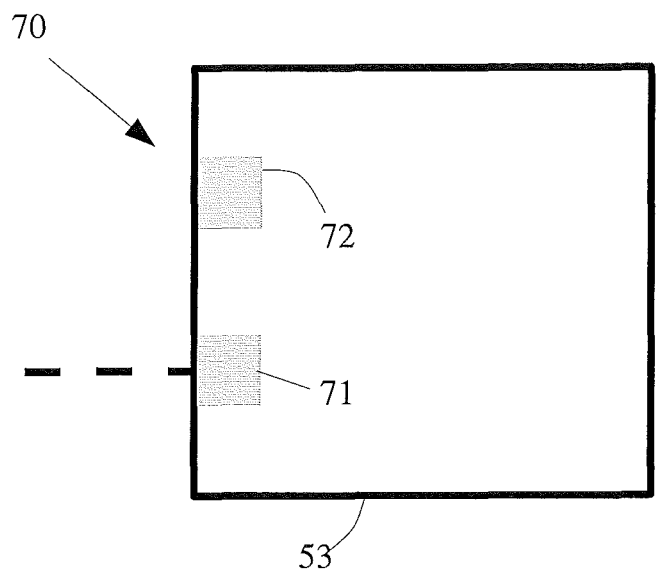
FIGS. 9A and 9B are very schematic representations of the operation of an optical recognition system in a measuring assembly according to the invention.
Figure 9B:
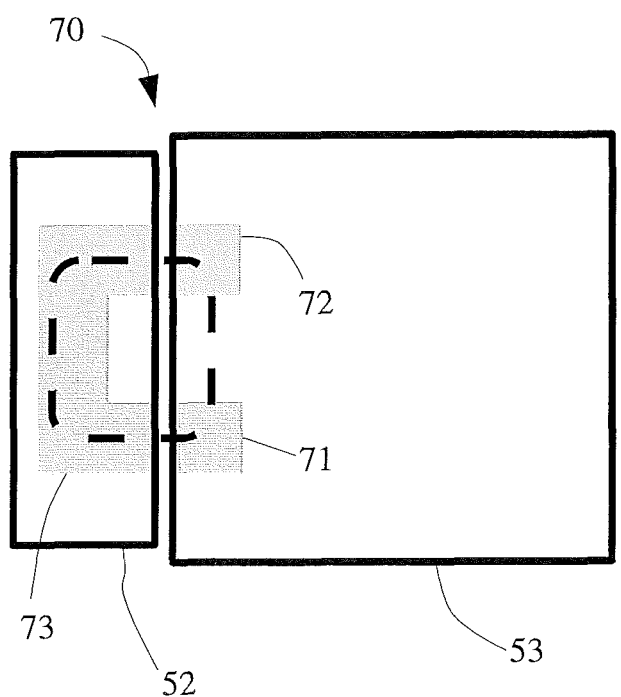
Figure 10:
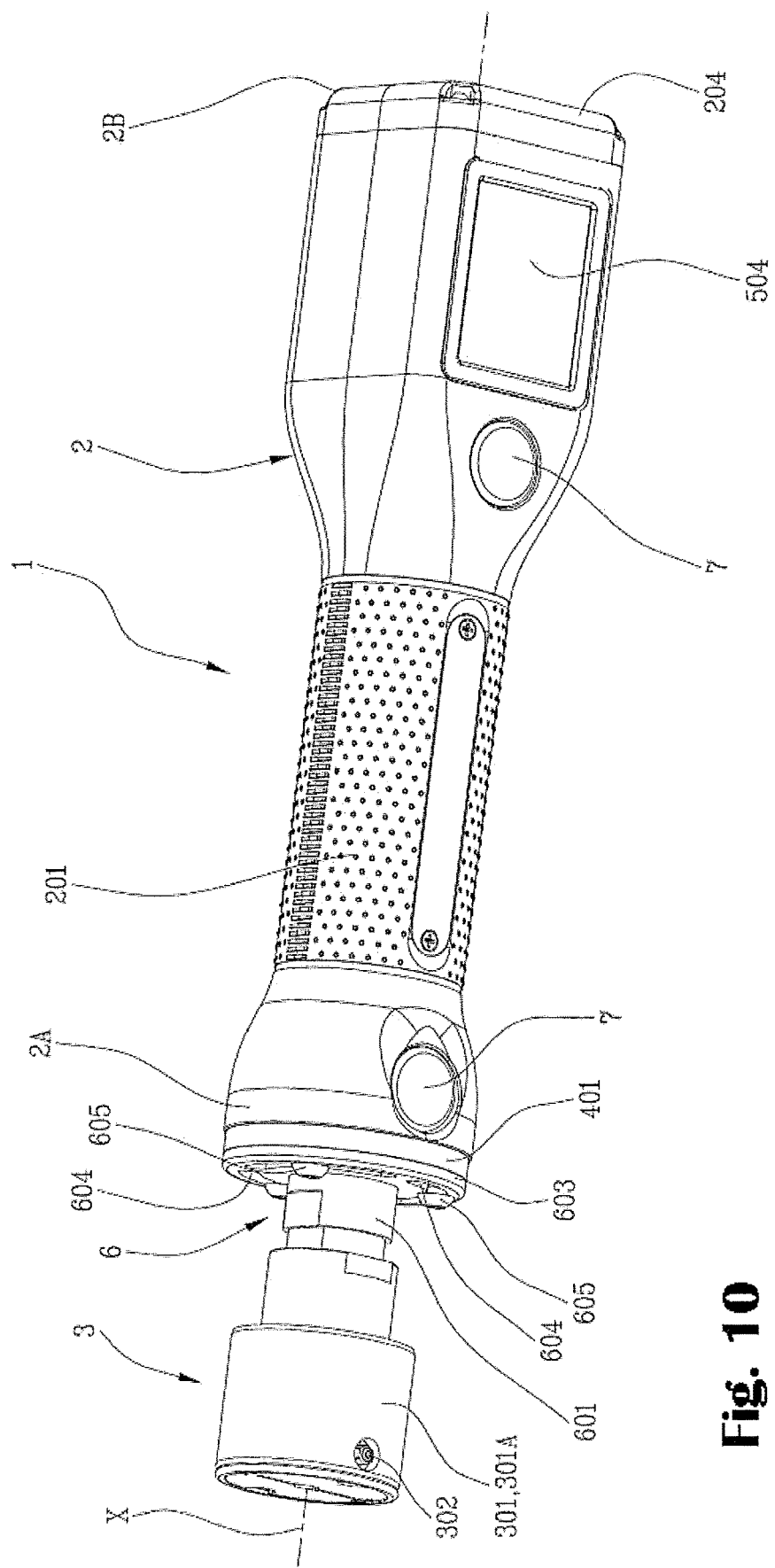
FIG. 10 shows a comparator, more specifically a plug gauge, part of a measuring assembly according to the present invention, in a perspective view.
Figure 11:
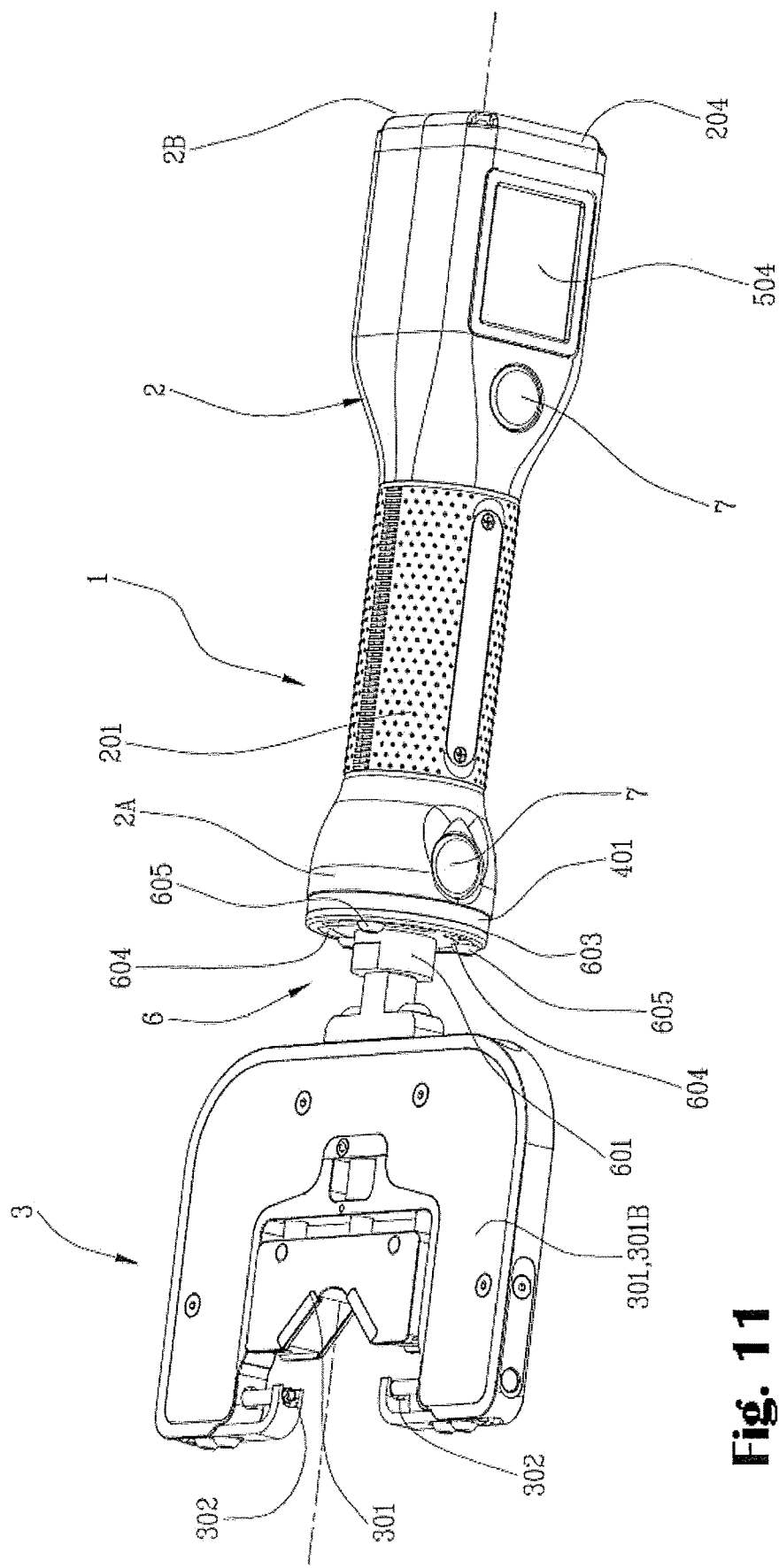
FIG. 11 shows another comparator, more specifically a snap gauge, part of a measuring assembly according to the present invention, in a perspective view.
Figure 12:
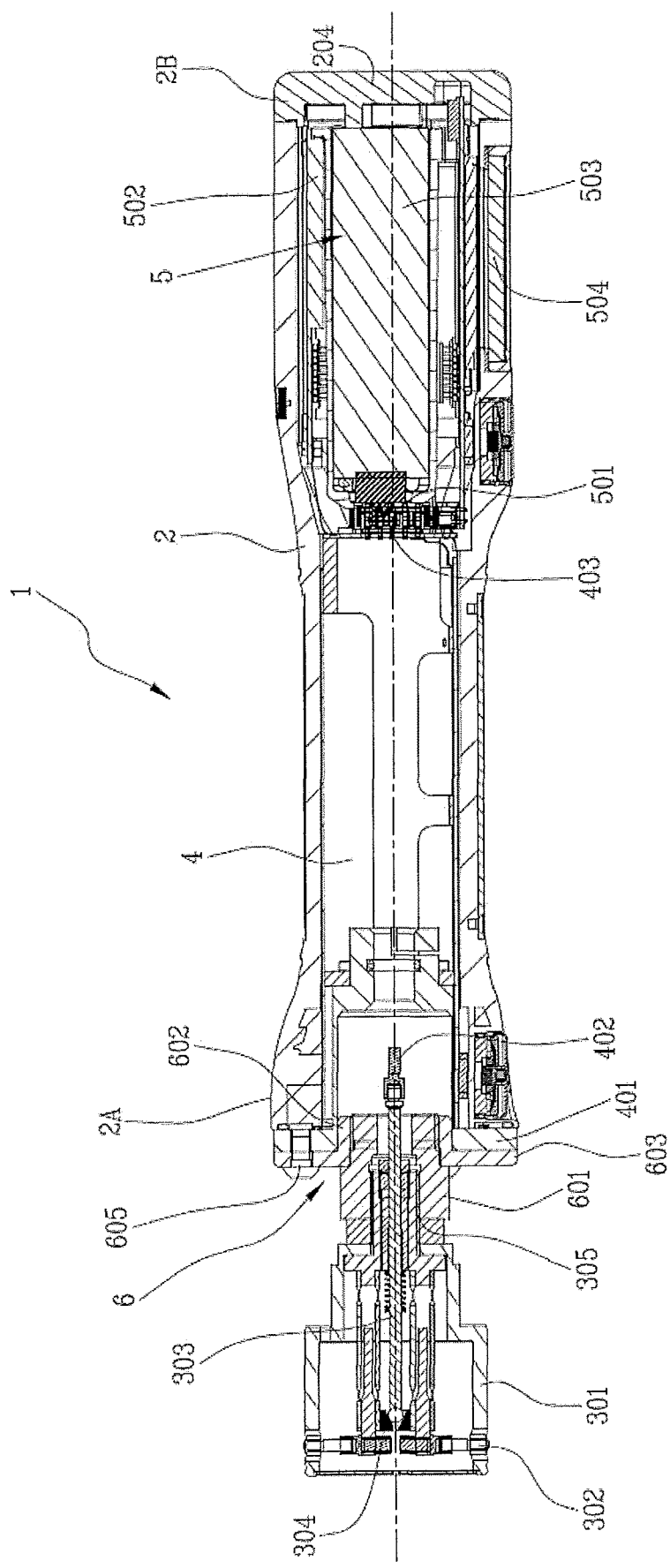
FIG. 12 shows the comparator of FIG. 10, sectioned along a longitudinal plane.
Figure 15:
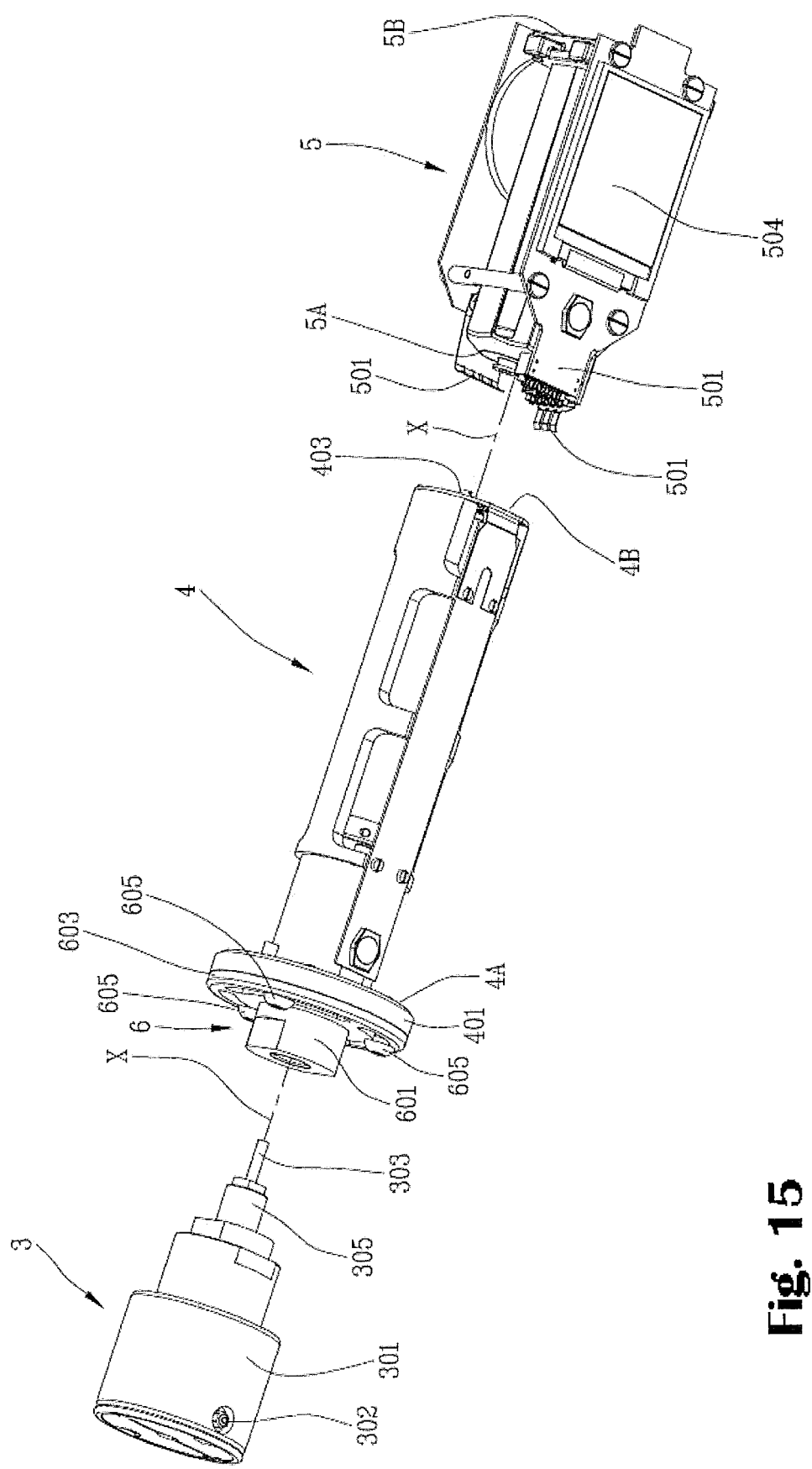
FIG. 15 is an exploded view showing the probe, the front end and the back end of the comparator of FIG. 10.
Figure 16:
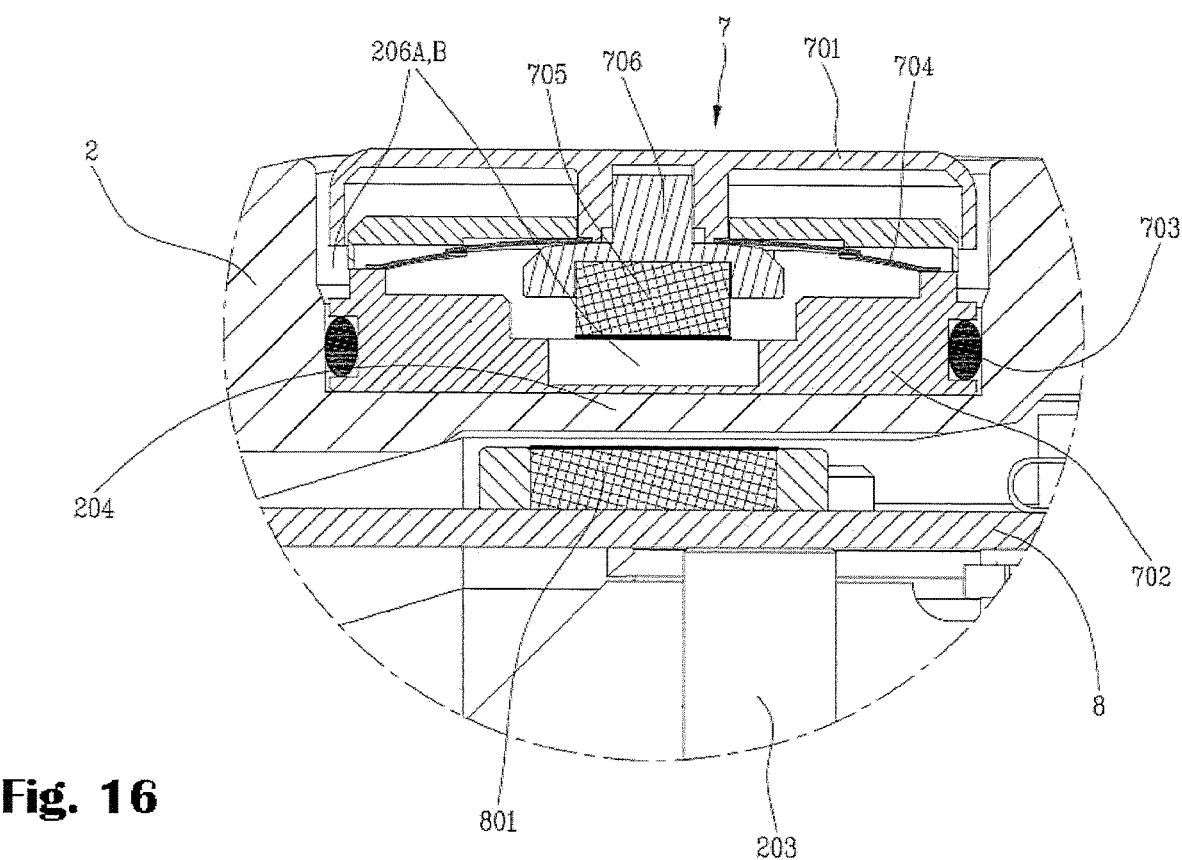
FIG. 16 shows an enlarged and inverted detail of FIG. 12.
Figure 17:
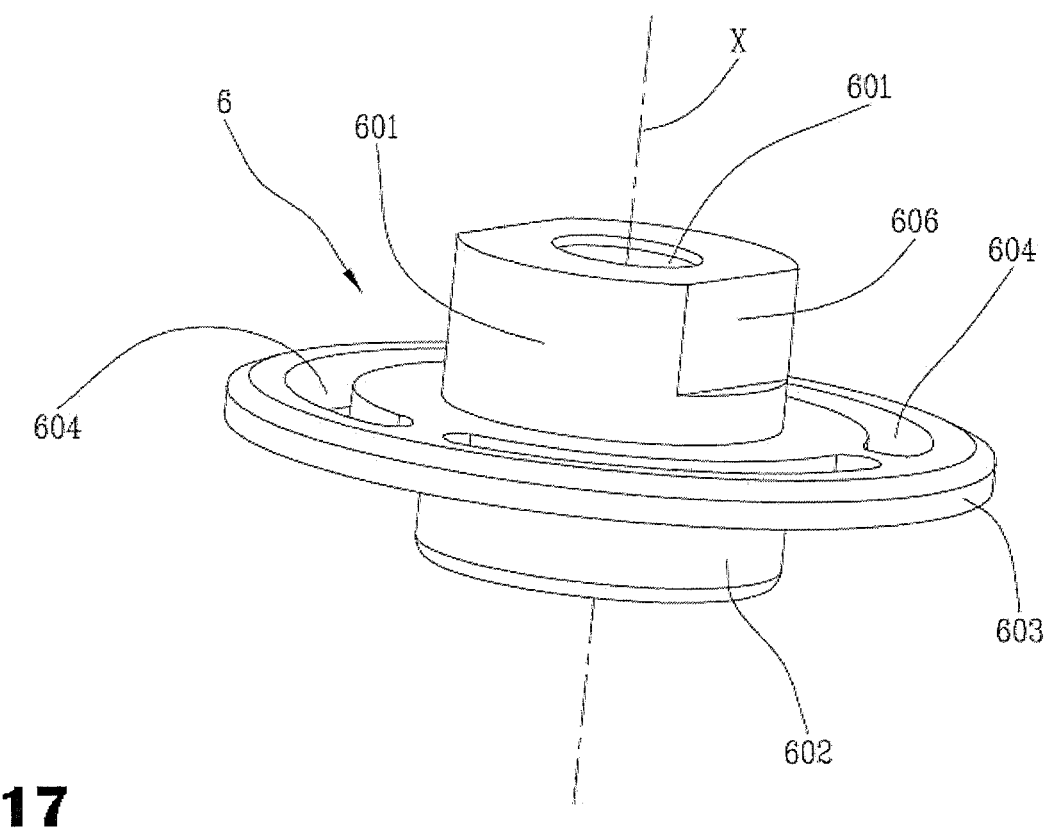
FIG. 17 shows a detail of FIG. 15.

The operation of the optical recognition system 70 is now described with reference to FIGS. 9A and 9B, in which the light beam is schematically indicated by means of dashed lines.

As previously mentioned, the emitter 71 emits a light beam. In the case that the comparator 52 is not present or is not correctly positioned in the stand 53, the light beam emitted by the emitter 71 is propagated in the air, away from the stand 53, and the receiver 72 does not detect any electromagnetic field. In this circumstance, the receiver 72 transmits to the processing unit a non-detection signal which results in an indication of the lacking or incorrect positioning of the comparator 52.

If the comparator 52 is present and properly positioned in the stand 53, the optical guide 73 faces the emitter 71 and consequently alters the propagation of the light beam causing it to pass through and be guided by the optical guide 73. More precisely, the light beam enters the optical guide 73 through the end of the latter which is facing the emitter 71, it propagates in the optical guide 73 and comes out from it through the other end which faces the receiver 72. If the light beam intensity exceeds a minimum threshold value, it is detected by the receiver 72 which sends to an external processing unit (not shown in the figure) a detection signal. On the basis of per se known processing, the processing unit provides, on the basis of the received detection signal, information of a correct positioning of the comparator 52. As in the case of the recognition system of the magnetic type, the optical type recognition system can be associated to a charging device, disposed inside of the stand 53, for charging the battery 90 of the comparator 52. The block diagram shown in FIG. 8 is also applicable to the optical type recognition system. In this case the emitter 71 and receiver 72 are powered by the voltage regulator of the charging device.

As mentioned above, the light beam that propagates in the optical guide 73 is detected by the receiver 72 only if its intensity exceeds a certain threshold value. To reduce the risk that the receiver 72 accidentally detects a different, improper electromagnetic field alien to the recognition system, such as the ambient light of a workshop environment, it is possible to correlate the detection by the receiver 72 not to a certain intensity threshold value but to a specific pattern, for example defining and controlling a lighting on and off sequence. In this way, the receiver 33 detects only the light beam that has the specific pattern and the possibility that a wrong light beam be detected is considerably reduced.

In case that the recognition system is associated with the charging device of the battery of the comparator 52, it is advantageous to integrate the components of the recognition system arranged in the stand 53—namely core 64 and sensor 67 of the magnetic system, or emitter 71 and receiver 72 of the optical system—in the electronic board 68 that is present in the stand 53 and comprises the power supply unit. However, it is possible to use separate electronic boards for the different systems, also placed in different positions of the stand 53, and to provide a connection therebetween.

It is also possible to place the recognition system in a different position than that as described heretofore. In other words, while in the above described and illustrated embodiments the field source and the sensor are arranged in correspondence of the vertical side of the stand 53, it is possible to arrange them in different areas of the stand 53, by appropriately determining, in the comparator 52, the position of the matching element. However, it is preferable that the recognition system of the magnetic type be not positioned at the base of the stand, because the magnets may interfere with the antenna that is present at the ending part of the comparator and, therefore, with the wireless transmission between the comparator 52 and the external processing unit U (FIG. 1).

It is also possible to provide more recognition systems in the stationary part to increase the reliability of the detection, or recognition.

The recognition system in a measuring assembly according to the invention has a further advantage with respect to the known recognition systems. In fact it is a stable system featuring hysteresis, and consequently intermittent and discontinuous operation is avoided when the comparator 52 is located with respect to the stand 53 in a position corresponding to a distance between the components of the recognition system close to the limit useful for allowing the detection. This feature increases the level of reliability of the recognition system.

Figure 18:
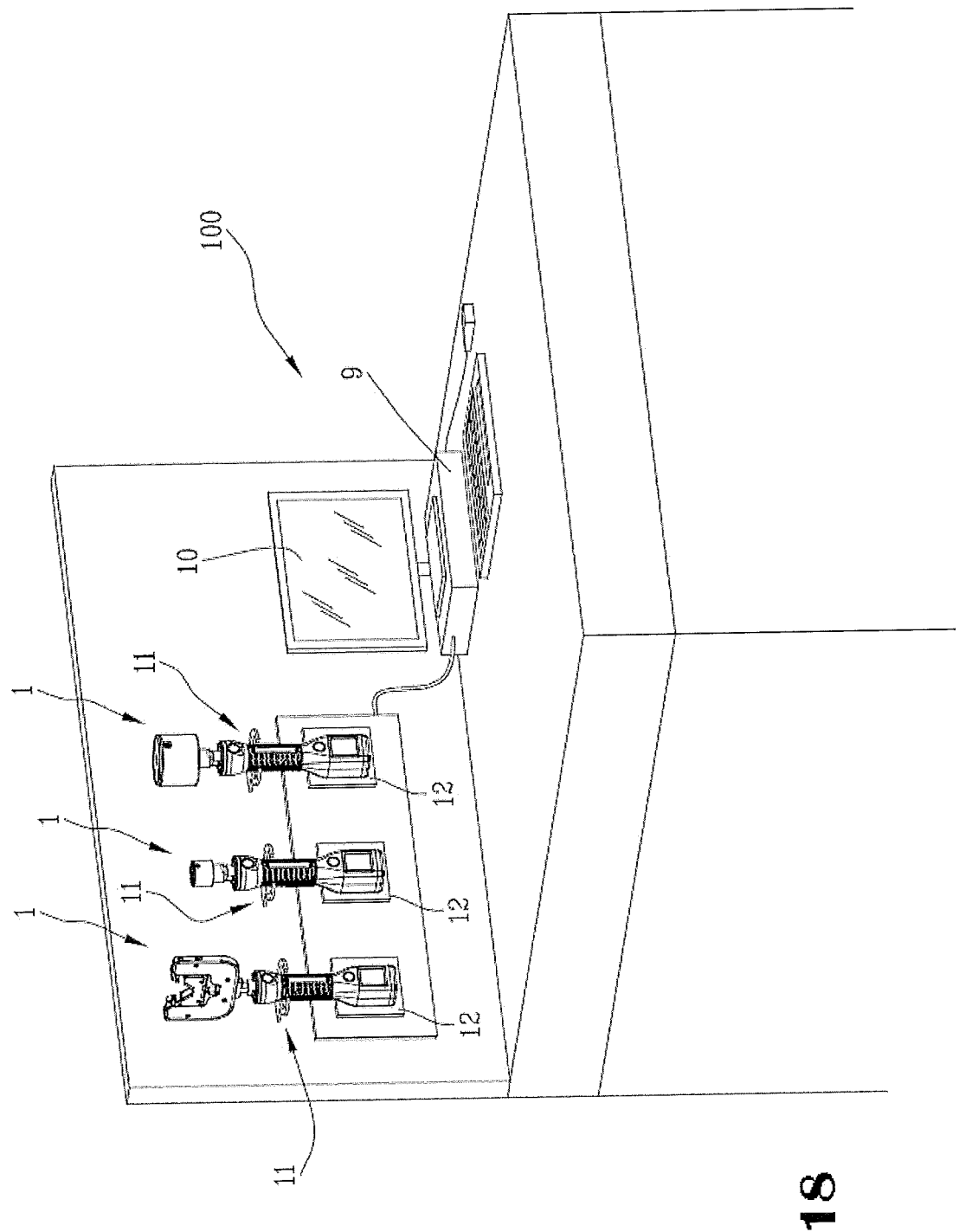
FIG. 18 shows a workshop of a measuring assembly according to the present invention.
Figure 19B:
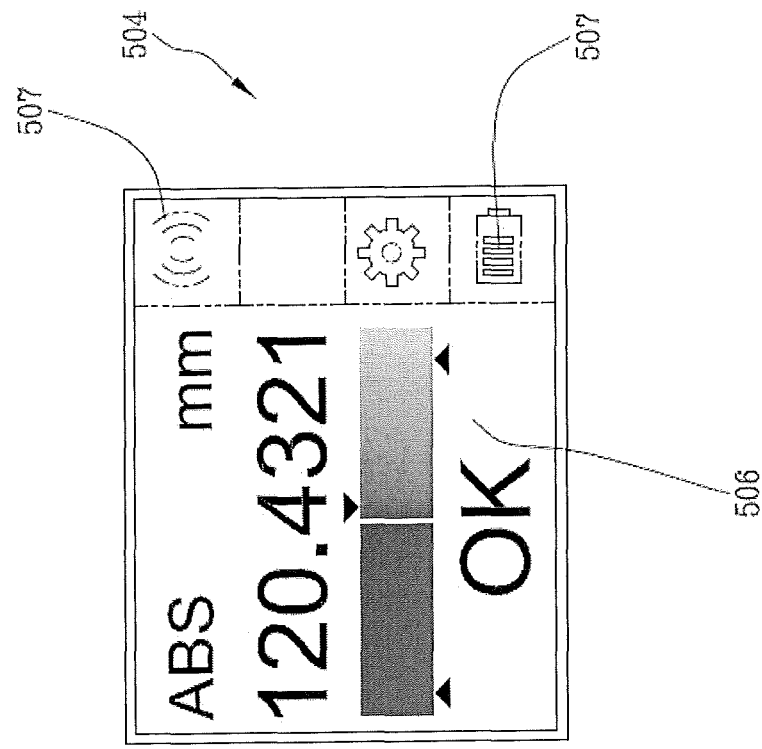
FIG. 19B illustrates the image of FIG. 19A in a configuration rotated 90 degrees.
Figure 19A:
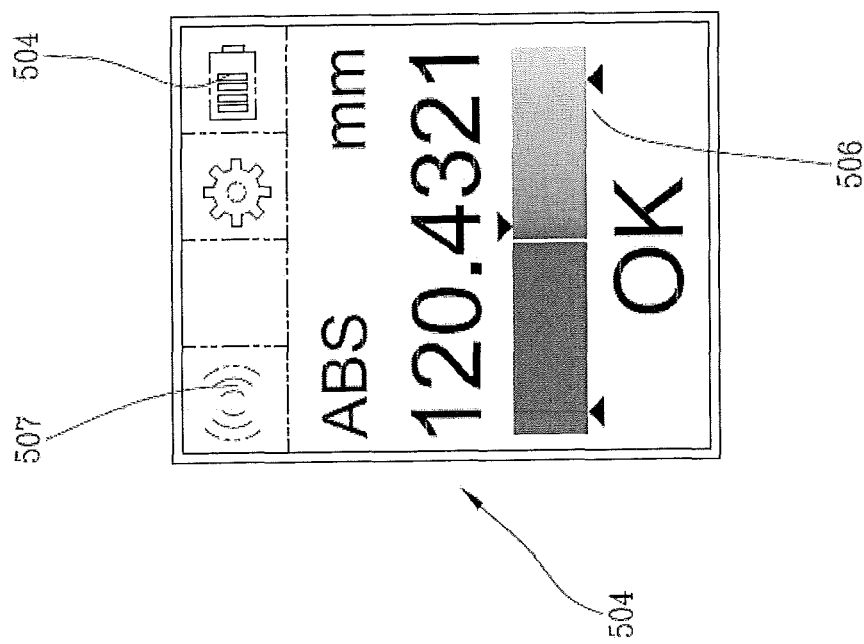
FIG. 19A shows an image displayed in the display of the comparator of FIG. 10.
Figure 20B:
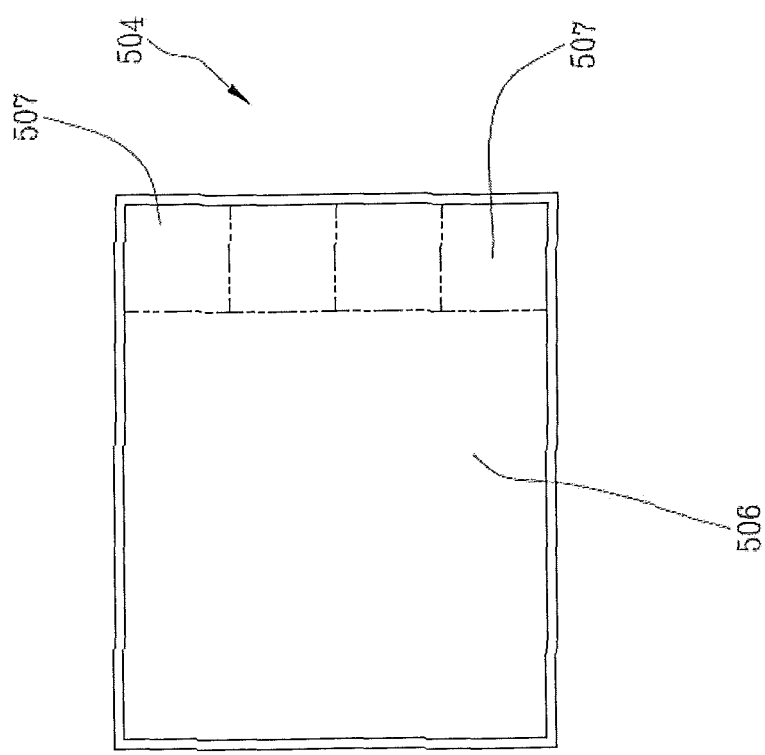
FIG. 20B illustrates the display of FIG. 19B, empty, i.e. without elements of the image.
Figure 20A:
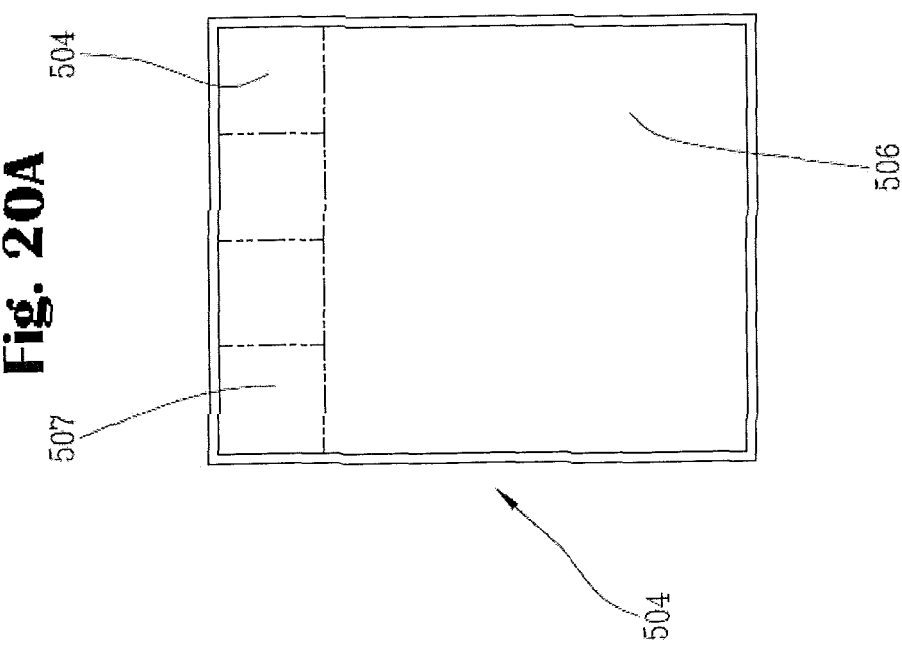
FIG. 20A illustrates the display of FIG. 19A, empty, i.e. without elements of the image.

The measuring apparatuses according to the embodiments so far described and shown comprise a stationary part provided with a housing with a seat in which the comparator is inserted. However, it is possible that the stationary part includes just one support element for the comparator that is coupled to a wall of a measurement station and that the field source of the recognition system is also connected to the wall and positioned at an appropriate height with respect to the position that the comparator does assume when it is supported by the support element, for instance as shown in FIG. 18.

The recognition system in a measuring assembly according to the invention is described herein in combination with an inductive charging device, but can also be associated to other kinds of charging devices, for example charging devices provided with electrical contacts.

The measuring apparatus here described and illustrated, in a measuring assembly according to the invention, comprises a removable device for the checking of internal diameters of mechanical pieces. However, measuring apparatuses of different types can be provided, for example with a removable device for checking external dimensions of a mechanical piece or that performs other kinds of dimensional and/or form checkings.

The description that follows refers to other features and advantageous aspects in connection with measuring apparatuses—and methods—that can be part of—and used in—a measuring assembly according to the present invention.

In FIGS. 10, 11, 12, 18 reference number 1 indicates a comparator for measuring and/or checking a mechanical piece.

The comparator has an elongated shape and extends along a longitudinal axis X.

The comparator 1 comprises a shell, or protective shell, 2. The shell 2 has a first end 2A and a second end 2B.

The shell 2 defines a handgrip 201. The handgrip 201 is interposed between the first end and the second end 2A 2B. The shell 2, in correspondence of the handgrip 201, has a reduced external section, with respect to sections at the first end 2A and at the second end 2B.

The handgrip 201 is covered with a wrinkled layer to increase a grip of the hand on the shell 2.

The shell 2 has a first opening 202A, in correspondence of the first end 2A, and a second opening 202B, in correspondence of the second end 2B.

The shell 2 has an internal space 203; the internal space 203 is in communication to the outside through the first opening 202A and second opening 202B.

The shell 2 comprises a closure cap 204 closing the second opening 202B.

The shell 2 defines, on at least an external wall 205 (or outer surface), one or more external housings. In the illustrated example, the shell 2 defines a first external housing 206A and a second external housing 206B.

The first external housing 206A is positioned between the first end 2A and the handgrip 201, preferably at a distance from the first end 2A of less than 15 mm.

The second external housing 206B is positioned between the second end 2B and the handgrip 201.

The first and the second external housings 206A, 206B are blind openings accessible only from the outside of the shell. The wall 205 is uninterruptedly interposed between the internal space 203 and the external housings 206A, 206B and forms a physical barrier that provides sealing. Moreover it defines an electrical insulation between the external housings 206A, 206B and the internal space 203.

The wall 205 is preferably made of plastic material, preferably dielectric.

The shell 2 comprises two parts integral with each other: a body 207 made of plastic material, for example polymer, and a core 208, preferably made of metal or another material with particular mechanical resistance.

The body 207 constitutes a matrix that encapsulates and encompasses at least a part of the core 208. Preferably, the body 207 is molded onto the core 208.

The core 208 has an engagement surface 209, radially extended and accessible at the first end 2A of the shell. The engagement surface 209 is located at an end of the core 208, is longitudinally elongated and is preferably of annular shape. At the end opposite to the engagement surface 209, the core 208 of the shell 2 defines one or more pins 210, or other protrusions elongated longitudinally away from the engagement surface 209. These pins 210 are embedded in the body 207 of the shell 2 to confer mechanical strength to the structure of the shell 2.

The shell 2 also has an opening 211 to hold a display. The opening 211, in the example shown in the drawings, is rectangular.

The core 208 of the shell 2 defines a guide 212, or a properly shaped surface area to guide the insertion of an object into the internal space 203.

The comparator 1 has a probe 3, for interacting with the mechanical part to be measured or checked.

The probe 3 has a coupling element 301, for coupling to the mechanical part to be measured or checked.

The coupling element 301 may be shaped as a drum 301A, in the case in which the comparator 1 is of the "plug" type (plug gauge), or as a fork 301B, in the case in which the comparator 1 is of the "snap" or "fork" type (snap gauge). This distinction does not affect other aspects of the present disclosure.

The probe has at least one movable feeler 302; in the illustrated examples it has two movable feelers 302 forming a pair. The feeler 302 is adapted to get in contact with the mechanical part to be measured or checked, and to consequently move.

The probe 3 comprises a stem 303, movable along the longitudinal axis X. Furthermore, the probe 3 includes a transmission unit 304, configured to kinematically connect the stem 303 (and thus a position transducer, see below) to said at least one feeler 302. In the illustrated example the transmission unit 304 comprises a pair of tapered anvils connected to the feelers 302 and a ball cooperating with the anvils and connected to the stem 303. Other per se knows transmission units may be employed without effect on other aspects of the description.

The probe 3 also includes a threaded portion 305, formed at one end of the probe generally opposite to the end that directly cooperates with the workpiece or part to be measured and carrying the feelers 302.

The comparator also includes a first block 4 also referred to as "front end" 4, and a second block 5, also referred to as "back end" 5.

The front end 4 is elongated along the longitudinal axis X and has a first end 4A and a second end 4B.

At the first end 4A, the front end 4 has a radial expansion 401 shaped as a flange. The remaining portion of the first block 4, between the radial expansion 401 and the second end 4B, has lower cross section than the radial expansion 401. This remaining portion of the first block 4 is insertable in the internal space 203 of the shell 2. Instead, the radial expansion 401 is configured to abut against a surface of the first end 2A of the shell 2 directed longitudinally, because it has larger cross section than the internal space 203 of the shell 2.

The front end 4 is provided with a position transducer, shown schematically in the figure with the reference 402, operatively interacting with the stem 303 of the probe 3 to detect the axial displacement, i.e. the displacement along the longitudinal axis X, of the stem 303.

The first block 4 comprises a first plurality of electrical contacts 403, positioned at the second end 4B of the front block 4; such electrical contacts 403 are electrically connected to the position transducer 402 location.

The radial expansion 401 is drilled to receive fixing screws (or other fasteners), to secure the radial expansion 401 to the first end 2A of the shell 2, and more particularly to the engagement surface 209 of the core 208 to the shell 2.

The second block or back end 5 is elongated along the longitudinal axis X and has a first end 5A and a second end 5B.

The back end 5 has a cross section fitted to enter the internal space 203 of the shell 2 through the second opening 202B and to slide inside the internal space 203 along the longitudinal axis X.

The back end 5, in correspondence of the first end 5A, has a second plurality of electrical contacts 501. The electrical contacts 501 of the second plurality are configured to match with corresponding electrical contacts 403 of the first plurality, the latter being part of the first block 4.

In the illustrated example, the electrical contacts 501 of the second plurality are resilient, more specifically they are retractable contacts. That is, the electrical contacts 501 of the second plurality are displaceable by elastic deformation between a first and a second position, for example in the longitudinal direction or, as in the illustrated example, in a radial direction, in the course of the approaching movements and partial overlap between the front 4 and back 5 ends along the longitudinal axis, in a per se known way that is not shown in the figures.

According to another embodiment, the electrical contacts 403 of the first plurality are resilient, whether or not the electrical contacts 501 of the second plurality are resilient, too.

When the front end 4 and the back end 5 are inserted into the internal space 203 of the shell 2 in the respective working positions defined by respective mechanical references (in which the first block 4 is fixed to the first end of the shell 2A and the second block 5 is completely contained in the internal space 203, with the second end 2B of the shell 2 closed by the cap 204), the electrical contacts 403 and 501 of the first and second plurality press, for example, along radial directions, against each other, deforming and pushing back the resilient electrical contacts in a retracted position.

The back end 5 comprises electronic circuits 502 (in the following description, reference will be made indifferently to an electronic board 502, to indicate such electronic circuits). The electronic board 502 comprises a processor, for processing data, and a memory, for storing data, at least temporarily.

The electronic board 502 is intended to receive in input a signal generated by the position transducer 402, to process it. For example an analog/digital conversion of such signal is carried out.

In addition, the second block 5 comprises a transmitter for wireless communication of data, for example via the Bluetooth protocol, or through other communication protocols.

The second block 5 also includes a battery 503, to provide power to the electronic board 502 and the other electrical and electronic components of the comparator 1.

In addition, the second block 5 comprises a charging element (not shown), connected to the battery 503 and configured to generate, more specifically output a charging current to the battery 503.

The charging element is preferably inserted in the shell 2 or in the wall 205 of the shell 2, and is configured to receive an electrical power signal through a non-contact coupling, for example an inductive coupling.

For example, the charging element of the comparator 1 is configured to interact with an external recharging terminal.

The electronic board 502 is connected to the charging element for detecting a charging condition of the battery 503.

In practice, the charging element is switchable between an active configuration, in which it interacts with a power source that is external to the comparator 1 (positioned in the vicinity of the charging element) and generates said charging current, substantially as described with reference to FIGS. 1 to 9B, and an idle configuration, in which it does not charge the battery 503.

The electronic board 502 is connected to the charging element to detect its configuration, and, in one embodiment, it is programmed to activate a power-on procedure and/or a power-off procedure of the comparator 1, depending on the configuration of the charging element.

In an embodiment, the comparator 1 comprises a display 504.

The display 504 is connected to the electronic board 502. The display 504 is inserted into the opening 211 of the shell 2 to be visible from the outside of the comparator 1.

The display 504 is housed behind a borosilicate glass (for example 3 mm thick) and protected by a frame and by a gasket. The display 504 is preferably backlighted, for example with white backlight.

The electronic board 502 is programmed to display in the display 504 an image containing image elements representing data detected by the position transducer 402, and possibly states or configurations of the comparator 1, such as the status of the battery charge and the presence of a wireless connection.

The electronic board 502 is programmed for updating the image displayed on the display 504, by replacing it with other images in which the image elements, compared to the substituted image, are rotated with respect to a reference integral to the comparator 1, such as for instance the longitudinal axis X extending from the first to the second ends of the shell 2.

In an embodiment, the comparator 1 includes, in the internal space 203 of the shell 2, an inertial sensor such as an accelerometer, or another sensor adapted to detect a spatial orientation of the comparator 1.

The inertial sensor is connected to the electronic board 502.

In an embodiment, the electronic circuits 502 are programmed to rotate the image elements as a function of a signal generated by the inertial sensor.

In an embodiment, the electronic board 502 is programmed to start a power-on and/or a power-off procedure of the comparator 1, as a function of a signal generated by the inertial sensor.

In an embodiment, the electronic circuits 502 are programmed to display the image elements arranging them in areas or quadrants into which the display area of the display 504 is divided up. Such areas are preferably squared areas. Preferably, the display 504 of the comparator 1 is divided in a plurality of such areas. Preferably at least a first area and at least a second area are squares having different extension.

In the illustrated embodiment, the display 504 has a rectangular shape and is divided up into a big first square 506, having the same side length as the length of the short side of the rectangle, and a plurality of small second squares 507. In particular, the display 504 has the shape of a rectangle having a short side and a long side, wherein the electronic circuits 502 are programmed to generate an image having a first portion, showing a first square whose side is the length of the short side of the rectangle, and a second portion showing a plurality of second squares, the length of each of whose sides is equal to the difference between the long side and the short side of the rectangle, wherein the image elements are divided into a plurality of graphical objects, wherein each graphical object is positioned inside a corresponding square in the context of the first square 506 and of the second squares 507.

Preferably, the electronic board 502 is programmed to rotate the image elements according to the following procedure.

The available pixels are divided in elementary blocks having a square shape, corresponding to the above-mentioned areas. The big square 506 contains the detected figure (preferably in both numerical and graphic format); the small squares 507 containing status information, such as the current operating mode, the battery level, the level of the radio signal, a feedback on keypresses and similar information.

The electronic board 502 is programmed to rotate the image elements of an angle of 90 degrees or multiples thereof.

In this way, it is possible to orient the display 504 in the four main directions, two "portrait" and two "landscape", maintaining uniformity of representation and simplicity of graphic result, thanks to the fact that each individual square area is rotated around its center.

From the implementation point of view this operation is particularly simple, since the image stored in the electronic board 502 (or in the microprocessor of the electronic board 502) remains unchanged. In other words, processing depending from the desired display are not required, and it is sufficient to copy it in a memory of the display 504, point by point, reading from the memory of the electronic board 502 (or of the microprocessor of the electronic board 502) rows and columns in a different order.

The position of the status bar passes in a natural way from the upper to a side one, always ensuring that the operator can concentrate on the value and status of the measure.

The comparator 1 also comprises a fastening unit 6, to connect the probe 3 to the block 4 and the front shell 2.

The fastening unit 6 comprises a threaded member 601, configured to mate to the threaded portion 305 of the probe 3. Thus, the probe 3 can be fixed to fastening unit 6 by means of a threaded coupling, namely by screwing until two corresponding surfaces (one belonging to the probe 3 and one to the fastening unit 6) do not come into abutment to each other.

The fastening unit 6 comprises a centering element 602, configured to couple to the front end 4 (into a corresponding opening in the front end 4), with the possibility of relative rotation with respect to the front end 4, around the longitudinal axis X. The centering element 602, in the illustrated example, is an annular protrusion. The centering element 602 and the threaded member 601 are aligned along the longitudinal axis X and facing in opposite directions.

The retaining assembly 6 also includes a flange 603 radially extending about the longitudinal axis X. The flange 603 is interposed between centering element 602 and the threaded member 601.

The flange 603 defines one or more slots 604. In the illustrated example, the flange 603 has a plurality of slots arranged around the longitudinal axis X at equal angular distances.

The fastening unit 6 comprises one or more locking elements 605, to secure the flange 603 to the radial expansion 401 of the first block 4. In the illustrated example, the locking members 605 are screws.

Preferably, the locking elements 605 are equal in number to the number of the slots 603.

Preferably, the threaded member 601 defines flattened faces 606, to facilitate the proper grip by means of a key.

The locking members 605 are removable, configured to secure the fastening unit 6 to the front end 4 in a plurality of angular positions about the longitudinal axis X.

The slots 604 are elongated about the longitudinal axis X. The locking elements 605 are removable, to allow, in a removed or loosened condition, an adjustment of the angular position of the fastening unit 6 with respect to the front end 4.

In a different embodiment, not so advantageous as the above described one, the fastening unit 6 can be directly fixed to the first end 2A of the shell 2.

The comparator 1 also comprises at least one pushbutton 7. In the example illustrated, the comparator 1 comprises a first and a second pushbuttons 7. The first pushbutton 7 is inserted in the first external housing 206A of the shell 2, while the second pushbutton 7 is inserted in the second external housing 206B of the shell 2.

The pushbutton 7 (or each of the pushbuttons 7) includes a cap 701, preferably a metal cap, for external protection, on which the operator's finger does act.

In the illustrated example, the pushbutton 7 comprises a supporting base 702, firmly inserted, with a gasket 703, into the external housing 206A, 206B.

Furthermore, the pushbutton 7 includes a snap spring 704, preferably monostable. The spring 704 is arranged between the external housing 206A, 206B of the shell 2, or the supporting base 702 affixed thereto, and the cap 701. For example, the spring 704 is configured to maintain, in the absence of external forces, the cap 701 in a raised configuration, that is in an arrangement moved away from an outer surface of the housing 206A, 206B, namely the wall 205 of the shell 2. When a user's finger presses on the cap 701, it squeezes the spring 704 and pushes the cap 701 close to the wall 205 of the shell 2. Therefore, the pushbutton 7 is movable between two operating positions, a lowered position (activation or command position) and a lifted position (rest position).

Furthermore, in the illustrated example of the preferred embodiment, the pushbutton 7 includes a magnet 705, for example a permanent magnet.

The magnet 705 is connected to the cap 701 through a holder member 706, interposed between the magnet 705 and the cap 701.

The comparator 1 also comprises an electric control circuit 8 positioned in the internal space 203 of the shell 2 and connected to the electronic board 502.

The pushbutton 7 is magnetically coupled to the electric control circuit 8 to vary, as a function of its operating position, a control parameter detectable by the electronic board 502.

In the illustrated example, the electric control circuit 8 comprises at least a ferromagnetic core inductor 801 positioned in correspondence of the external housing 206A 206B, and the wall 205 is interposed between the magnet 705 of the pushbutton 7 and the ferromagnetic core inductor 801 of the electric control circuit 8. In the embodiment with two pushbuttons 7, the electric control circuit 8 has two ferromagnetic core inductors 801, each corresponding to a respective magnet 705.

In an embodiment, the comparator 1, more specifically—for example—the electronic board 502 of the comparator 1, comprises an electric generator configured to generate oscillating electrical signals (in particular pulses) in the electric control circuit 8. In an embodiment, the damping of said oscillating electrical signals is a function of the operating position of the pushbutton 7 and constitutes the control parameter.

In fact, the position of the magnet 705, arranged at a greater or lesser distance from the ferromagnetic core inductor 801 depending on the operating position of the pushbutton 7, determines a variation of the inductance of the control circuit 8.

It is observed that the presence of the magnet 705 allows to make the pushbutton 7 a control medium particularly precise and reliable, allowing a correct transmission of the control signals with a relatively large stroke of the cap 701. The width of the stroke is important because it is better perceived by the user and prevents false activations. Moreover, the presence of the magnet 705 allows a correct transmission of the control signals, even with a relatively large distance between the pushbutton 7 and the control circuit 8. In this way, the wall 205 can be particularly thick, so increasing reliability and robustness of the comparator 1.

The present description also relates to a measuring and checking apparatus 100 of mechanical parts, which constitutes a complete workstation for the user.

The apparatus 100 comprises a plurality of measuring and checking comparators 1. In general, the comparators 1 are manual comparators, preferably equipped with on-board battery and wireless communication. In particular, the comparators 1 are comparators having one or more of the above described features.

The apparatus 100 also includes a main processor 9 connected to a main screen 10.

The main processor 9 can wirelessly communicate with the comparators 1, to transmit data and receive data acquired by the electronic boards 502 of the same comparators 1.

The apparatus 100 also includes, preferably, a corresponding plurality of holders 11, configured to receive the respective comparators 1, when not in use.

In an embodiment, each holder 11 comprises a recharging terminal 12.

The recharging terminal 12 is configured to cooperate with the charging element on board of the comparator 1, preferably at a distance, without wires, to charge the battery 503.

In practice, when the comparator 1 is hooked or coupled to the holder 11, with its own charging element positioned in the vicinity of the corresponding recharging terminal 12, the recharging terminal 12, that is connected to a power source, generates—or induces in the preferred case of inductive coupling—a charging current within the comparator 1, to charge the battery.

The electronic circuits 502 of each comparator 1 are programmed to be set in a stand-by mode, where they are listening to a signal coming from the main processor 9, in response to a condition of charging the battery, that is, when the comparator 1 is hooked or coupled to the respective holder 11.

In an exemplary embodiment, the main processor 9 is programmed to generate and selectively transmit to the comparators 1 a power-on signal, and/or a power-off signal. The main processor 9 can also be programmed to generate and selectively transmit to the comparators 1 a power-on inhibiting signal.

The main processor 9 is programmed to display on the main screen 10 a sequence of operating instructions for the operations that the user must perform, calling the user to select the various comparators 1 as they are to be used, and put them away in their holders 11 after they have been employed, to move to the next comparator, in accordance with the displayed sequence.

In an example of realization, the main processor 9 is programmed to transmit to the electronic board 502 of one or more comparators of said plurality of comparators a power-on signal or a power-off signal for switching said comparator in the turned on or turned off configuration, according to the sequence of instructions displayed on the main screen 10.

In particular, the main processor 9 is programmed to transmit to the electronic board 502 of one of the comparators 1 of the apparatus 100 a power-on signal, substantially concurrently with a display of an instruction that includes the use of that comparator 1, or before such a display of a predetermined time interval.

In an embodiment, the main processor 9 is programmed to transmit, substantially concurrently with or previously to (of a predetermined time interval) a display of an instruction that includes the use of one of the comparators 1 of the apparatus 100, a power-off signal to the electronic board 502 of all other comparators 1 of the apparatus 100 that were in the turned on configuration.

In an embodiment, the main processor 9 is programmed to transmit, substantially concurrently with or previously to (of a predetermined time interval) a display of an instruction that includes the use of one of the comparators 1 of the apparatus 100, a inhibition of a power-on signal to the electronic board 502 of all other comparators 1 of the apparatus 100 that are in the turned off configuration.

Preferably, in response to the switching from the powered off to the powered on configuration of the comparator 1 (particularly in response to the power-on signal by the main processor 9), the display 504 on the comparator 1 is activated and possibly backlighted to be more easily recognizable by the user.

The apparatus shown and described here includes a display screen on which the sequence of operations that the user must follow is displayed. This display screen can, however, be omitted.

The invention claimed is:

1. A measuring assembly with a measuring apparatus and a recognition system for the measuring apparatus, the measuring apparatus including a removable device for checking dimensions and/or shape of a mechanical piece and a stationary part comprising at least one mechanical reference for the removable device, the recognition system comprising:

a field source placed in the stationary part and adapted to generate a field;

a matching element placed in the removable device and adapted to alter the field propagation;

at least one sensor fixed to the stationary part to detect the field generated by the field source, said at least one sensor generating a detection or a non-detection signal depending on the field propagation;

a processing unit connected to the at least one sensor and adapted to provide an indication of correct positioning of the removable device with respect to the stationary part depending on the signal generated by the at least one sensor.

2. The measuring assembly according to claim 1, wherein:

the field source comprises a C-shaped core made of ferromagnetic material with opposite poles and a magnet at each end, said core being adapted to generate a magnetic field;

the matching element comprises a ferromagnetic element adapted to be positioned to face the core when the removable device is correctly positioned with respect to the stationary part; and the at least one sensor is adapted to generate said non-detection signal of the magnetic field when the removable device is correctly positioned with respect to the stationary part and the magnetic field propagates in the ferromagnetic element.

3. The measuring assembly according to claim 2, wherein the core comprises a permanent magnet at each of its ends.

4. The measuring assembly according to claim 2, wherein the at least one sensor is positioned alongside the core next to one of its ends.

5. The measuring assembly according to claim 2, wherein the at least one sensor is positioned between the ends of the core.

6. The measuring assembly according to claim 2, wherein the core comprises a laminar element made of ferromagnetic material with two opposite folded edges which partially surround the magnets.

7. The measuring assembly according to claim 2, wherein the measuring apparatus further includes an inductive charging device including a primary coil placed in the stationary part and a secondary coil placed in the removable device, the processing unit being integrated into the charging device and controlling the feeding of the primary coil depending on the signal received by the at least one sensor.

8. The measuring assembly according to claim 2, wherein the removable device is a manual device comprising:

a handle;

a probe comprising a measuring armset with at least one arm movable about a fulcrum and at least one feeler fixed to the arm and adapted to touch the surface of the piece to be checked;

a transmission unit adapted to wirelessly send signals indicative of the measure; and a processing and display unit adapted to receive signals sent by the transmission unit and to provide data indicative of the performed measure.

9. The measuring assembly according to claim 1, wherein:
the field source comprises an emitter emitting a light beam;
the at least one sensor comprises a receiver;
the matching element comprises an optical guide with two ends, one being adapted to be positioned to face the emitter, the other being adapted to be positioned to face the receiver when the removable device is correctly positioned with respect to the stationary part; and
the receiver being adapted to generate said detection signal when it receives the light beam emitted by the emitter and propagated in the optical guide.

10. The measuring assembly according to claim 9, wherein the optical guide is U-shaped and is fixed to a seat of the removable device, in such a way that both its ends communicate with the outside of the removable device.

11. The measuring assembly according to claim 9, wherein the measuring apparatus further includes an inductive charging device including a primary coil placed in the stationary part and a secondary coil placed in the removable device, the processing unit being integrated into the charging device and controlling the feeding of the primary coil depending on the signal received by the at least one sensor.

12. The measuring assembly according to claim 9, wherein the removable device is a manual device comprising:
a handle;
a probe comprising a measuring armset with at least one arm movable about a fulcrum and at least one feeler fixed to the arm and adapted to touch the surface of the piece to be checked;
a transmission unit adapted to wirelessly send signals indicative of the measure; and
a processing and display unit adapted to receive signals sent by the transmission unit and to provide data indicative of the performed measure.

13. The measuring assembly according to claim 1, wherein the measuring apparatus further includes an inductive charging device including a primary coil placed in the stationary part and a secondary coil placed in the removable device, the processing unit being integrated into the charging device and controlling the feeding of the primary coil depending on the signal received by the at least one sensor.

14. The measuring assembly according to claim 1, wherein the removable device is a manual device comprising:
a handle;
a probe comprising a measuring armset with at least one arm movable about a fulcrum and at least one feeler fixed to the arm and adapted to touch the surface of the piece to be checked;
a transmission unit adapted to wirelessly send signals indicative of the measure; and
a processing and display unit adapted to receive signals sent by the transmission unit and to provide data indicative of the performed measure.

15. A recognition method to detect, in a measuring assembly, the correct positioning of a removable device for checking dimensions and/or shape of a mechanical piece with respect to a stationary part, the removable device comprising a matching element and the stationary part comprising a field source and at least one sensor, the recognition method comprising the steps of:
generating a field by means of the field source;
detecting by means of the at least one sensor an alteration of the propagation of the field depending on the position of the matching element;
generating a detection or a non-detection signal; and
providing an indication about the positioning of the removable device depending on the generated signal.

16. The recognition method according to claim 15, wherein the field is a magnetic field and the matching element comprises a ferromagnetic element, and wherein the step of providing an indication about the positioning of the removable device includes providing an indication of correct positioning if said non-detection signal is generated.

17. The recognition method according to claim 15, wherein the field is an electromagnetic field and the field source generates a light beam and the matching element comprises an optical guide, and wherein the step of providing an indication about the positioning of the removable device includes providing an indication of correct positioning if a detection signal is generated.

* * * * *